United States Patent
Sasaki et al.

(10) Patent No.: US 10,965,823 B2
(45) Date of Patent: Mar. 30, 2021

(54) INFORMATION PROCESSING SYSTEM, DEVICE, AND METHOD

(71) Applicant: Ricoh Company, Ltd., Tokyo (JP)

(72) Inventors: Makoto Sasaki, Kanagawa (JP); Tadashi Sato, Kanagawa (JP); Fumiyoshi Kittaka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/437,093

(22) Filed: Jun. 11, 2019

(65) Prior Publication Data

US 2019/0297202 A1 Sep. 26, 2019

Related U.S. Application Data

(63) Continuation of application No. 15/681,063, filed on Aug. 18, 2017, now Pat. No. 10,375,256, which is a
(Continued)

(30) Foreign Application Priority Data

Jun. 11, 2013 (JP) .................................. 2013-123225

(51) Int. Cl.
*H04N 1/00* (2006.01)
*G06F 3/0489* (2013.01)
(Continued)

(52) U.S. Cl.
CPC ....... *H04N 1/00389* (2013.01); *G06F 3/0484* (2013.01); *G06F 3/0489* (2013.01);
(Continued)

(58) Field of Classification Search
CPC .......... H04N 1/00389; H04N 1/00278; H04N 1/00408; G06F 3/0489; G06F 3/0484; G06K 15/005
(Continued)

(56) References Cited

U.S. PATENT DOCUMENTS 8,271,890 B2 9/2012 Kunori
8,884,936 B2 11/2014 Nonaka et al.
(Continued)

FOREIGN PATENT DOCUMENTS

| CN | 1811686 A | 8/2006 |
|---|---|---|
| CN | 101738919 A | 6/2010 |

(Continued)

OTHER PUBLICATIONS

R. Soliday, "A TCL/TK Widget for Display of MEDM Screens," Proceedings of the 2005 Particle Accelerator Conference, Knoxville, TN, USA, 2005, pp. 3393-3395, doi: 10.1109/PAC.2005. 1591482. (Year: 2005).*
(Continued)

*Primary Examiner* — Bharatkumar S Shah
(74) *Attorney, Agent, or Firm* — Oblon, McClelland, Maier & Neustadt, L.L.P.

(57) ABSTRACT

An information processing system includes a first display control unit and a second display control unit. The first display control unit displays, on a display unit, a button on which a setting value of a program is displayed. The second display control unit starts up the program when the button is pressed and, in accordance with the started program, displays, on the display unit, a setting screen that corresponds to the button being pressed.

18 Claims, 14 Drawing Sheets

Related U.S. Application Data continuation of application No. 14/297,981, filed on Jun. 6, 2014, now Pat. No. 9,774,751.

(51) Int. Cl.
  *G06F 3/0484* (2013.01)
  *G06K 15/00* (2006.01)

(52) U.S. Cl.
  CPC ......... *G06K 15/005* (2013.01); *H04N 1/0035* (2013.01); *H04N 1/00278* (2013.01); *H04N 1/00405* (2013.01); *H04N 1/00408* (2013.01); *H04N 1/00413* (2013.01); *H04N 1/00474* (2013.01); *H04N 1/00482* (2013.01)

(58) Field of Classification Search
  USPC ........................................................ 358/1.15
  See application file for complete search history.

(56) References Cited

U.S. PATENT DOCUMENTS

| | | | |
|---|---|---|---|
| 2002/0080376 A1 | 6/2002 | Momose | |
| 2005/0232656 A1* | 10/2005 | Asai | B42C 19/02 |
| | | | 399/130 |
| 2006/0077444 A1 | 4/2006 | Lum et al. | |
| 2006/0279474 A1 | 12/2006 | Lum et al. | |
| 2006/0279475 A1 | 12/2006 | Lum et al. | |
| 2009/0225353 A1 | 9/2009 | Ishibashi | |
| 2010/0122187 A1 | 5/2010 | Kunori et al. | |
| 2011/0134030 A1 | 6/2011 | Cho | |
| 2011/0317193 A1 | 12/2011 | Iwase et al. | |
| 2012/0131452 A1 | 5/2012 | Ogino et al. | |
| 2012/0140277 A1 | 6/2012 | Watanabe | |
| 2012/0192170 A1 | 7/2012 | Kobayashi et al. | |
| 2012/0206762 A1 | 8/2012 | Minagawa | |
| 2012/0235960 A1 | 9/2012 | Maekawa | |
| 2012/0287452 A1 | 11/2012 | Tsujimoto | |
| 2013/0077119 A1* | 3/2013 | Arai | G06F 3/0488 |
| | | | 358/1.13 |
| 2013/0100475 A1 | 4/2013 | Kuroyanagi | |
| 2016/0112644 A1 | 4/2016 | Nishi | |

FOREIGN PATENT DOCUMENTS

| | | |
|---|---|---|
| CN | 102681802 A | 9/2012 |
| CN | 102685346 A | 9/2012 |
| JP | 3803608 | 5/2006 |
| JP | 2009-069687 | 4/2009 |
| JP | 2011-205254 | 10/2011 |
| JP | 2012-155406 | 8/2012 |
| JP | 5056322 | 8/2012 |
| JP | 5318907 | 7/2013 |

OTHER PUBLICATIONS

Extended European Search Report dated Oct. 23, 2014 in Patent Application No. 14171780.1.
Chinese Office Action dated Nov. 30, 2016 for Chinese Application No. 201410255394.5 with English translation.

\* cited by examiner

INFORMATION PROCESSING SYSTEM, DEVICE, AND METHOD

CROSS-REFERENCE TO RELATED APPLICATIONS

The application is a continuation of and claims the benefit of priority under 35 U.S.C. § 120 from U.S. application Ser. No. 15/681,063 filed Aug. 18, 2017, which is a continuation of U.S. application Ser. No. 14/297,981 filed Jun. 6, 2014 (now U.S. Pat. No. 9,774,751 issued Sep. 26, 2017), and claims the benefit of priority under 35 U.S.C. § 119 from Japanese Patent Application No. 2013-123225 filed Jun. 11, 2013, the entire contents of each of which are incorporated herein by reference.

BACKGROUND OF THE INVENTION

1. Field of the Invention

The present invention relates to an information processing system, device, and method.

2. Description of the Related Art

Japanese Patent Application Laid-open No. 2011-205254 discloses an information terminal that enables a user to return from a basic operation screen, such as a standby screen or desktop (screen), to the previously displayed screen in an easy manner.

In this information terminal, a log storage unit stores, as a screen log in a database (DB), the information that indicates the started application program (AP) and the information that indicates the screen displayed by the AP on a display unit. A receiving unit receives a specific key input when the standby screen is displayed on the display unit. Furthermore, a display control unit starts up the AP that is indicated by the screen log, which is read from the DB when the key input is received, and, in accordance with the started AP, it controls the display unit so as to display the screen that is indicated by the screen log. Thus, a user is capable of easily returning (redisplaying) from the basic operation screen, such as a standby screen or a desktop screen, to the screen that is displayed before the previous termination of the AP.

Here, in the information terminal that is disclosed in Japanese Patent Application Laid-open No. 2011-205254, the screen that can be redisplayed is limited to a screen that is stored as a screen log in the DB. Therefore, in the information terminal of Japanese Patent Application Laid-open No. 2011-205254, if a screen is to be started up which is other than the screen that is stored in the DB as a screen log, an operator needs to perform the following operation. Specifically, in this case, the operator needs to perform an operation to return from the redisplayed screen (the previous display screen) to the screen of the general menu and then performs an operation to select a desired menu item from the general menu.

In the information terminal of Japanese Patent Application Laid-open No. 2011-205254, only the previous display screen is the screen that can be redisplayed by only a single operation step, i.e., only performing an operation to input a specific key. In the information terminal of Japanese Patent Application Laid-open No. 2011-205254, if the screen other than the previous display screen is to be displayed, at least two operation steps need to be performed after the previous display screen is displayed, i.e., an operation step for returning the display to the screen of the general menu once, and an operation step for performing an operation again to select a desired menu item from the general menu. Thus, in the information terminal of Japanese Patent Application Laid-open No. 2011-205254, there is a problem in that, if the screen other than the previous display screen is to be displayed, the number of operation steps is increased.

Therefore, there is a need for an information processing system, device, and method that achieve a reduction of the number of operation steps required to display a desired screen.

SUMMARY OF THE INVENTION

According to an embodiment, an information processing system includes a first display control unit and a second display control unit. The first display control unit displays, on a display unit, a button on which a setting value of a program is displayed. The second display control unit starts up the program when the button is pressed and, in accordance with the started program, displays, on the display unit, a setting screen that corresponds to the button being pressed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A detailed explanation is given below, with reference to the attached drawings, of an embodiment of an information processing system, device, and method. In the following, an explanation is given by using a multifunction peripheral (MFP) as an example of the information processing system. The multifunction peripheral is a device that has at least two functions out of a print function, copy function, scanner function, and facsimile function.

First Embodiment

Figure 1:
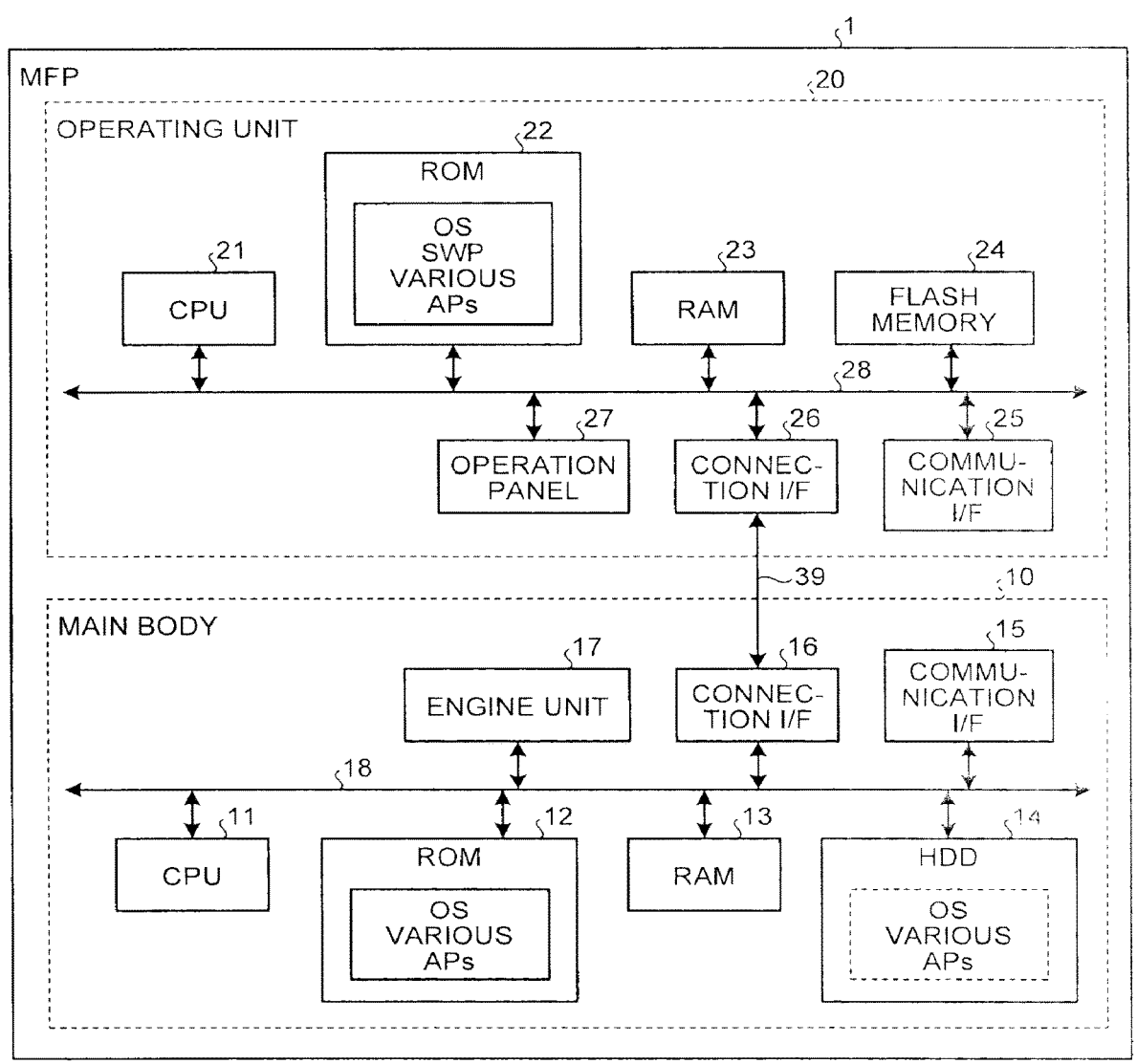
FIG. 1 is a hardware configuration diagram of an MFP of according to a first embodiment.

FIG. 1 is a hardware configuration diagram of an MFP 1 according to a first embodiment. As illustrated in FIG. 1, the MFP 1 includes a main body 10 that is capable of performing various functions, such as a copy function, scanner function, fax function, and printer function, and includes an operating unit 20 that receives an input in accordance with an operator's operation. The main body 10 and the operating unit 20 are communicatively connected to each other via a dedicated communication path 39. For example, the one with a USB (Universal Serial Bus) standard may be used as the communication path 39; however, the one with any standard may be used regardless of whether it is wired or wireless.

The main body 10 is capable of performing an operation in accordance with an input received by the operating unit 20. Furthermore, the main body 10 is capable of also communicating with an external device, such as a client PC (personal computer) and is capable of performing an operation in accordance with an instruction received from the external device.

The main body 10 includes a CPU 11, a ROM 12, a RAM 13, an HDD (hard disk drive) 14, a communication I/F (interface) 15, a connection I/F 16, and an engine unit 17, and they are connected to one another via a system bus 18. The CPU is an abbreviation for "Central Processing Unit". The ROM is an abbreviation for "Read Only Memory". The RAM is an abbreviation for "Random Access Memory".

The ROM 12 stores a copy application program (copy AP) and a scanner application program (scanner AP) in addition to an OS (Operating System) program. Furthermore, the ROM 12 stores a facsimile application program (fax AP) and a printer application program (printer AP). Moreover, the ROM 12 stores various types of programs. Although the ROM 12 stores the above-described various types of programs, the HDD 14 may store them.

The CPU 11 controls an operation of the main body 10 in an integrated manner. The CPU 11 uses the RAM 13 as a work area (working space) and executes the programs stored in the ROM 12, the HDD 14, or the like, so as to control the overall operation of the main body 10 and perform the above-described various types of functions, such as a copy function, scanner function, fax function, or printer function.

The communication I/F 15 is an interface for communicating with an external device, such as the client PC (personal computer). The connection I/F 16 is an interface for communicating with the operating unit 20 via the communication path 39.

The engine unit 17 is general-use hardware that performs processing other than information processing and communication in order to perform a copy function, scanner function, fax function, and printer function. For example, it includes a scanner (image read unit) that scans and reads an image of an original document, a plotter (image formation unit) that performs printing on a sheet material, such as paper, a fax unit that performs a fax communication, or the like. Furthermore, it may include a specific option, such as a finisher that separates a printed sheet material, or an automatic document feeder (ADF: Auto Document Feeder) that automatically feeds original documents.

Next, the operating unit 20 includes a CPU 21, a ROM 22, a RAM 23, a flash memory 24, a communication I/F 25, a connection I/F 26, and an operation panel 27, and they are connected to one another via a system bus 28.

The operating unit 20 performs a communication with the main body 10 so as to execute information processing in conjunction with the main body 10. Therefore, the ROM 22 stores the OS (Operating System) program so that the operating unit 20 can perform information processing separately from the main body 10. Furthermore, the ROM 22 stores the copy AP, scanner AP, fax AP, and printer AP in the same manner as the ROM 12 of the main body 10.

Furthermore, the ROM 22 of the operating unit 20 stores a setting widget program (SWP) for displaying a setting widget on the MFP 1's home screen (a screen that corresponds to what is called a desktop screen) that is displayed on the operation panel 27. The SWP is a widget that displays the current settings of various types of functions, for example, a copy function, or printer function, on the home screen. It will be explained in detail later.

The CPU 21 controls an operation of the operating unit 20 in an integrated manner. The CPU 21 uses the RAM 23 as a work area (working space) and executes the programs stored in the ROM 22, the flash memory 24, or the like. Thus, the CPU 21 controls the overall operation of the operating unit 20 and performs various types of functions, which will be explained later, such as a display of information (image) in accordance with an input received from a user.

The communication I/F 25 is an interface for communicating with, for example, a server device via a network, such as the Internet or a LAN (Local Area Network). The connection I/F 26 is an interface for communicating with the main body 10 via the communication path 39.

The operation panel 27 is what is called a touch panel in which a touch detection unit formed of a transparent electrode and a liquid crystal display unit are integrally formed. The operation panel 27 receives various types of inputs in accordance with an operator's touch operation and displays various types of information (for example, information in accordance with a received input, information that indicates the operation status of the MFP 1, information that indicates the setting status, or the like). Although the operation panel 27 is configured by using the touch detection unit and the liquid crystal display unit, this is not a limitation. For example, an organic EL (Electroluminescence) display unit may be used instead of the liquid crystal display unit.

The operating unit 20 including the operation panel 27 may be a mobile terminal device, such as what is called a tablet terminal or smartphone. In this case, the operating unit 20 is provided with a wireless communication function. Furthermore, the operating unit 20 can be attached to or removed from the main body 10. Furthermore, if the operating unit 20 is attached to the main body 10, it performs a wire communication with the main body 10 via each of the connection I/Fs 16, 26. Furthermore, if the operating unit 20 is removed from the main body 10, it performs a communication with the main body 10 by using the wireless communication function.

Figure 2:
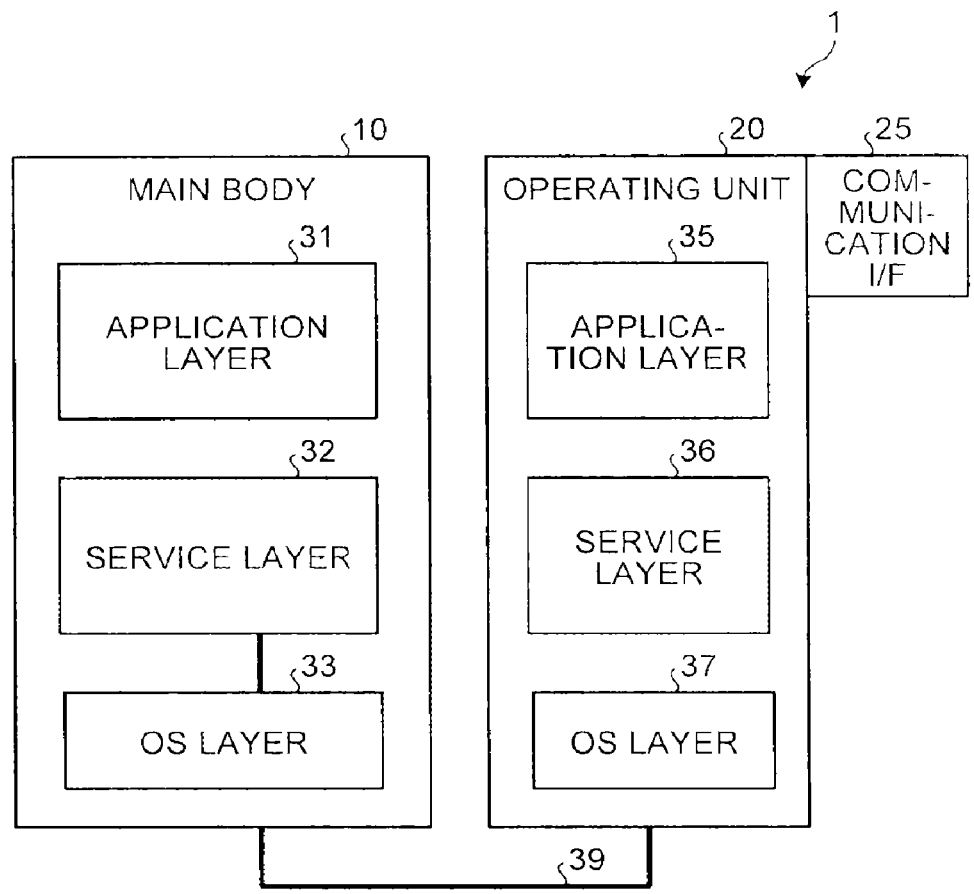
FIG. 2 is a schematic view that illustrates an example of a software configuration of the MFP according to the first embodiment.

Next, an explanation is given of a software configuration of the MFP 1. FIG. 2 is a schematic view that illustrates an example of the software configuration of the MFP 1. As illustrated in FIG. 2, the main body 10 includes an application layer 31, a service layer 32, and an OS layer 33. The application layer 31, the service layer 32, and the OS layer 33 are actually various types of software stored in the ROM 12 (or the HDD 14). The CPU 11 executes the software so that various types of functions are provided.

The software of the application layer 31 is an application program (AP) for providing a predetermined function by operating the hardware resources. For example, the AP includes the copy AP for providing the copy function, the scanner AP for providing the scanner function, the fax AP for providing the fax function, the printer AP for providing the printer function, or the like.

The software of the service layer 32 is interposed between the application layer 31 and the OS layer 33, and it is the software for providing the AP with an interface in order to use the hardware resources included in the main body 10. More specifically, it is the software for providing a function to receive an operation request to the hardware resources and to arbitrate between the operation requests. The operation request received by the service layer 32 is, for example, a request for reading of the scanner, printing of the plotter, or the like.

The function of the interface by the service layer 32 is provided to not only the application layer 31 of the main body 10 but also an application layer 35 of the operating unit 20. Specifically, the application layer 35 of the operating unit 20 is also capable of performing a function that uses the hardware resources (for example, the engine unit 17) of the main body 10 by using the interface function of the service layer 32.

The software of the OS layer 33 is the basic software (operating system) for providing the basic function to control the hardware included in the main body 10. The software of the service layer 32 converts a request to use the hardware resources from the various APs into a command interpretable by the OS layer 33 and delivers it to the OS layer 33. Furthermore, the command is executed by the software of the OS layer 33 so that the hardware resources are operated in accordance with the request from the AP.

Similarly, the operating unit 20 includes the application layer 35, a service layer 36, and an OS layer 37. The layered system of the application layer 35, the service layer 36, and the OS layer 37, which are included in the operating unit 20, is the same as that on the side of the main body 10. However, the function provided by the AP of the application layer 35 and the type of operation request that can be received by the service layer 36 are different from those on the side of the main body 10. Although the AP of the application layer 35 may be software for providing a predetermined function by operating the hardware resources included in the operating unit 20, it principally includes software for providing the function of a UI (user interface) in order to display or perform an operation with regard to the functions (the copy function, scanner function, fax function, and printer function) included in the main body 10.

The software of the OS layer 33 on the side of the main body 10 and the software of the OS layer 37 on the side of the operating unit 20 are different from each other in order to maintain independence of the functions as described above. Specifically, the main body 10 and the operating unit 20 operate independently from each other by using the different OSs. For example, it is possible that Linux (registered trademark) is used as the software of the OS layer 33 on the side of the main body 10 and Android (registered trademark) is used as the software of the OS layer 37 on the side of the operating unit 20.

As described above, in the MFP 1, as the main body 10 and the operating unit 20 operate by using the different OSs, a communication between the main body 10 and the operating unit 20 is performed as a communication between different devices rather than an interprocess communication within the same device. It corresponds to an operation (a command communication) to transmit the input (the details of an instruction from an operator) received by the operating unit 20 to the main body 10 or an operation performed by the main body 10 to notify an event to the operating unit 20, or the like. Here, the operating unit 20 performs a command communication with the main body 10 so that the function of the main body 10 can be used. Furthermore, the event that is notified by the main body 10 to the operating unit 20 includes the execution status of an operation of the main body 10, the details of settings made by the side of the main body 10, or the like.

Figure 3:
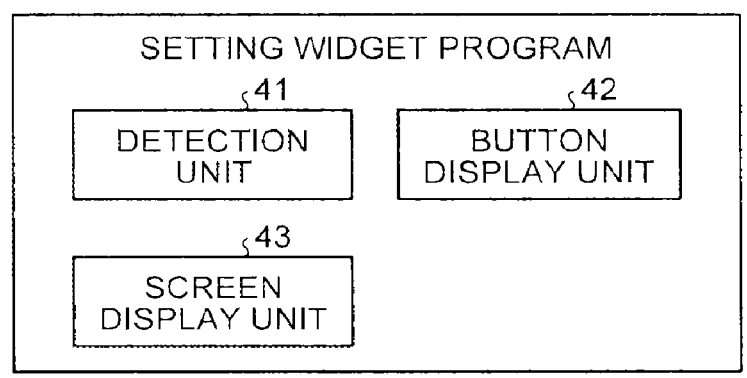
FIG. 3 is a functional block diagram of a setting widget program (SWP) that is installed in the MFP according to the first embodiment.

In the MFP 1 of the first embodiment, the ROM 22 of the operating unit 20 stores therein a setting widget program (SWP). Furthermore, the SWP enables a display of, on the home screen, the setting widget that indicates the current settings of various types of functions, such as the copy function or the printer function. FIG. 3 illustrates a functional block diagram of the SWP. As illustrated in FIG. 3, the SWP causes the CPU 21 to function as a detection unit 41, a button display unit 42, and a screen display unit 43. In the explanation given in this example, the detection unit 41, the button display unit 42, and the screen display unit 43 are implemented as software functions; however, all or part of them may be implemented by hardware. Furthermore, the button display unit 42 is an example of a first display control unit. Furthermore, the screen display unit 43 is an example of a second display control unit.

The detection unit 41 performs a communication with various APs that are stored in the ROM 12 via the CPU 11 of the main body 10 at an interval of a predetermined time, such as an interval of 10 seconds or an interval of 1 minute, so as to detect various current setting values that are set in the AP on the side of the main body 10. Furthermore, the detection unit 41 stores in, for example, the RAM 23 or the flash memory 24, various detected setting values of the AP on the side of the main body 10 as various setting values of the AP on the side of the operating unit 20. Thus, various current setting values that are set in the AP on the side of the main body 10 are applied to various setting values of the AP on the side of the operating unit 20.

The button display unit 42 displays a setting widget constituted by buttons on which the various setting values that are applied to the AP on the side of the operating unit 20 are displayed. The buttons are for displaying the various current setting values and for causing a setting screen of a setting item, which corresponds to a setting value, to be displayed. When an operator presses a desired button, the screen display unit 43 starts up the AP that corresponds to the button being pressed, and displays, on the operation panel 27, a setting screen that corresponds to the button being pressed.

Figure 4:
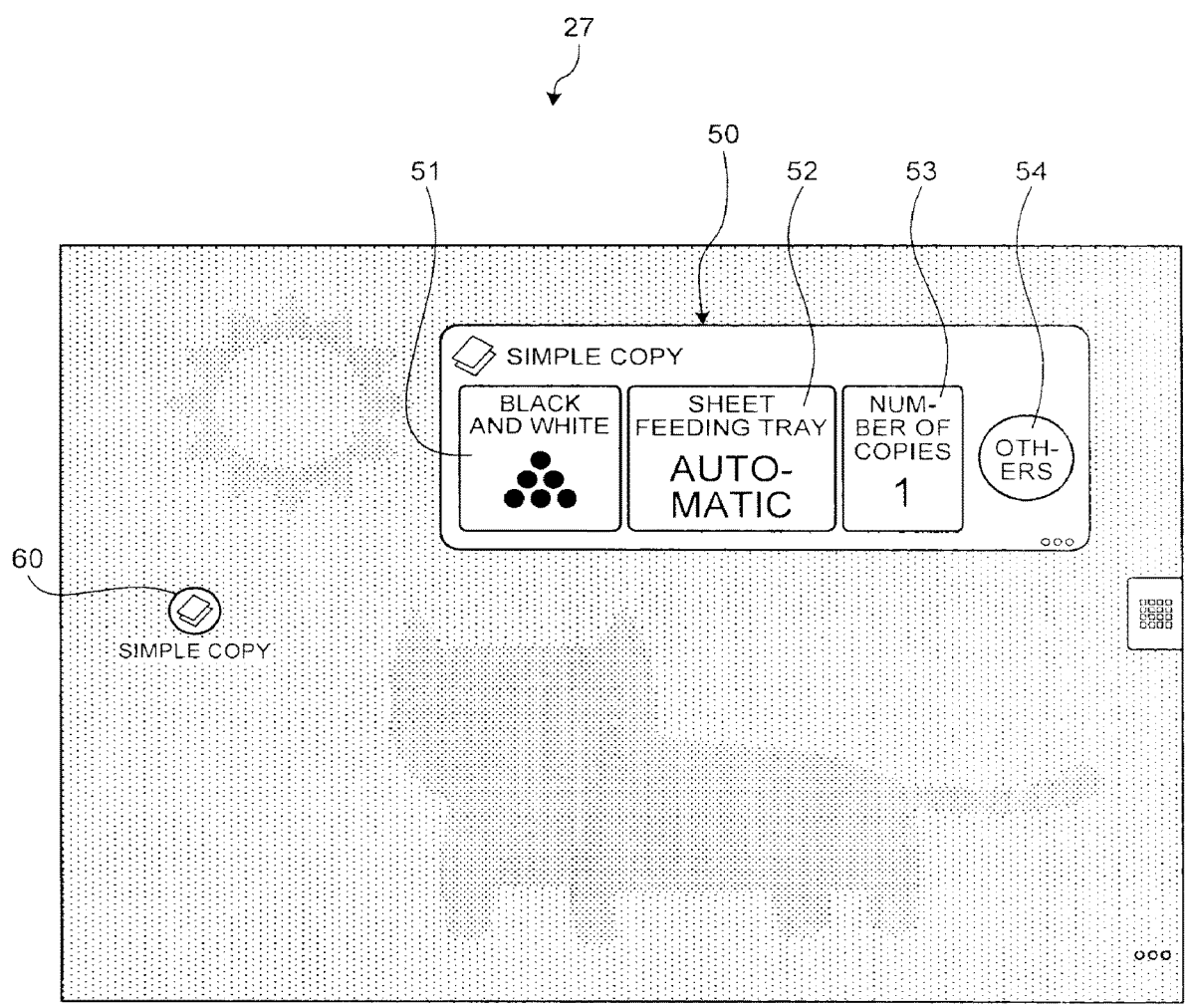
FIG. 4 is a diagram that illustrates a display example of a setting widget that is displayed on a home screen of the MFP according to the first embodiment.
Figure 5:
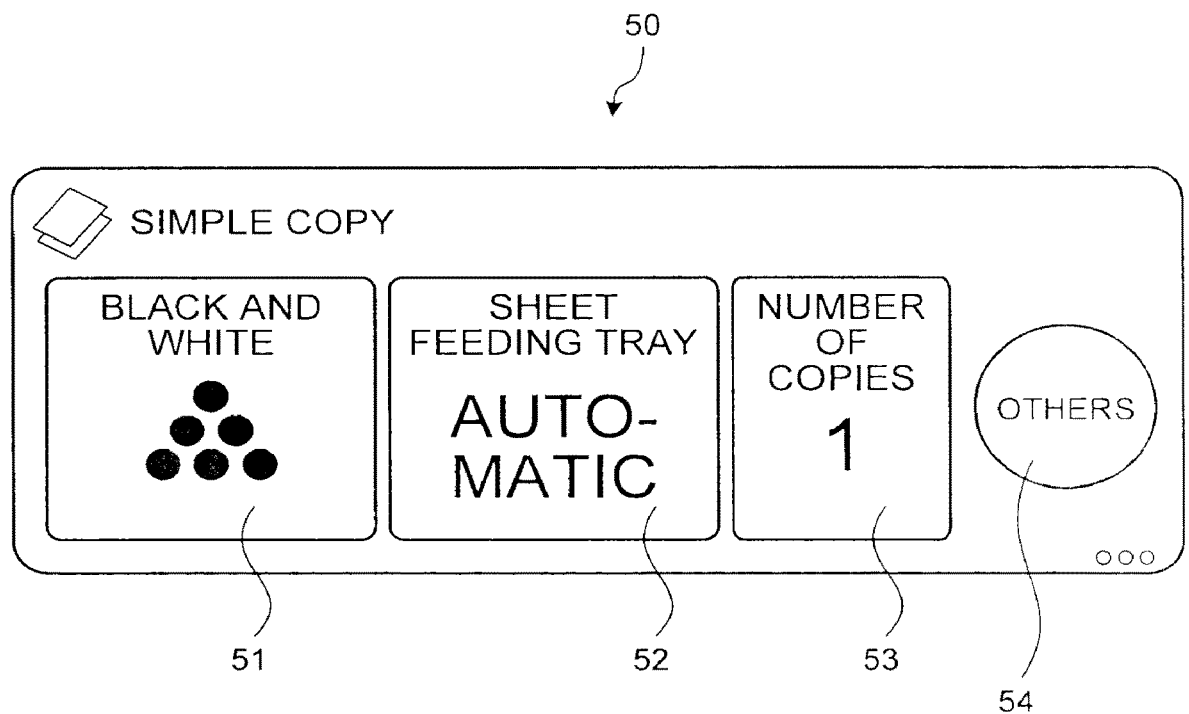
FIG. 5 is an enlarged view of the setting widget.

FIG. 4 illustrates the home screen that is displayed on the operation panel 27 and a setting widget 50 that is displayed on the home screen. Furthermore, FIG. 5 illustrates an enlarged view of the setting widget 50. The setting widget 50 illustrated in FIGS. 4 and 5 is an example of the setting widget that corresponds to the copy function. The setting widget 50 of the copy function includes first to fourth buttons 51 to 54.

The first button 51 is for causing a color setting screen to be displayed. The color setting screen is for making settings of colors to be used in printing. In this example, it is possible to designate the colors to be used in printing from, for example, "black and white", "automatic color", and "full color". The example in FIG. 4 and FIG. 5 indicates that "black and white" is being set by an operator. In this case, the CPU 21 of the operating unit 20 displays the characters "black and white" on the first button 51 of the setting widget 50 in accordance with the SWP. Thus, the operator knows that "black and white" is currently set as the colors to be used in printing.

The second button 52 is for causing a tray setting screen) to be displayed. The tray setting screen is for designating a tray from which a sheet is fed. In this example, it is possible to designate a desired setting from, for example, "automatic sheet feeding", "manual feeding tray", "first tray", and "second tray". The example of FIGS. 4 and 5 illustrates that an operator sets "automatic sheet feeding". In this case, the CPU 21 of the operating unit 20 displays the characters "automatic" on the second button 52 of the setting widget 50 in accordance with the SWP. Thus, the operator knows that the setting is made such that the sheet feeding tray is automatically selected.

The third button 53 is for causing a number-of-copies setting screen to be displayed. The number-of-copies setting screen is for setting the number of print copies. As described below in detail, in this example, when causing the number-of-copies setting screen to be displayed, the numerical keypad of "0" to "9" is displayed. An operator operates the numerical keypad so as to input the desired number of copies. The example of FIGS. 4 and 5 illustrates that the operator sets "1" as the number of copies. In this case, the CPU 21 of the operating unit 20 displays the character "1" on the third button 53 of the setting widget 50 in accordance with the SWP. Thus, the operator knows that the number of print copies is set to one.

The order of the setting items that are assigned to the first to third buttons 51 to 53, i.e., the order of the color setting, the tray setting, the number-of-copies setting buttons, enables an operator to make the print settings in a natural way.

The fourth button 54 is for causing the other setting screens to be displayed. The CPU 21 of the operating unit 20 displays the characters "others" on the fourth button 54 of the setting widget 50 in accordance with the SWP. In the setting widget 50, the setting items are assigned to the first to third buttons 51 to 53 in descending order of frequency of changes in the settings. Specifically, in the case of the example illustrated in FIGS. 4 and 5, the setting item of the color setting is assigned to the first button 51, the setting item of the sheet feeding tray is assigned to the second button 52, and the setting item of the number of print copies is assigned to the third button 53. It may also be possible to display a button that is assigned to the other setting item other than the first to third buttons 51 to 53. In the case of this example, the setting screen of the setting item other than the above-described setting items is displayed by pressing the fourth button 54.

The setting widget 50 of FIGS. 4 and 5 is an example of the setting widget that corresponds to the copy function. In the same manner as the above-described setting widget 50 of the copy function, the setting widgets that correspond to the other functions, i.e., the scanner function, fax function, and printer function, are included in the setting widgets that display the buttons representing the current setting values.

Figure 6:
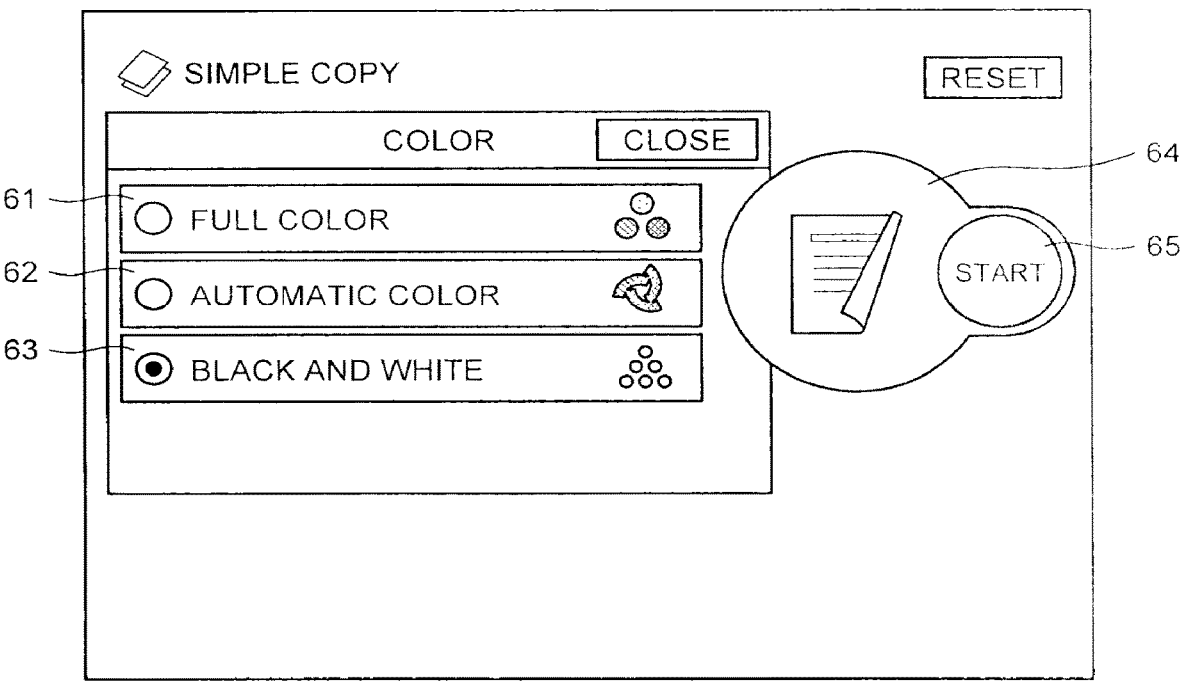
FIG. 6 is a diagram that illustrates a display example of the color setting screen.

Next, an explanation is given of each setting screen that is displayed when each of the buttons 51 to 54 of the setting widget 50 is pressed. First, FIG. 6 is a diagram that illustrates an example of the display of the color setting screen. When the first button 51 of the setting widget 50 is pressed, the CPU 21 of the operating unit 20 displays the color setting screen illustrated in FIG. 6 on the operation panel 27.

Specifically, the CPU 21 displays selection buttons 61 to 63 of "black and white", "automatic color", and "full color" illustrated in FIG. 6. Furthermore, the CPU 21 displays an output result icon 64 that shows the image of an output result and a start button 65 for starting the copying operation. An operator operates to select the button that corresponds to the desired color setting from the selection buttons 61 to 63. The CPU 21 of the operating unit 20 notifies the CPU 11 of the main body 10 of the color setting that is designated by any of the selection buttons 61 to 63. The CPU 11 of the main body 10 stores, in the ROM 12, the RAM 13, or the HDD 14, the color setting that is set by the operator via the copy AP stored in the ROM 12. Furthermore, when the CPU 21 of the operating unit 20 detects an operator' operation of the start button 65, it feeds a detection output to the CPU 11 of the main body 10. Thus, the CPU 11 of the main body 10 controls the copying operation in accordance with the color setting that is set by the operator.

Figure 7:
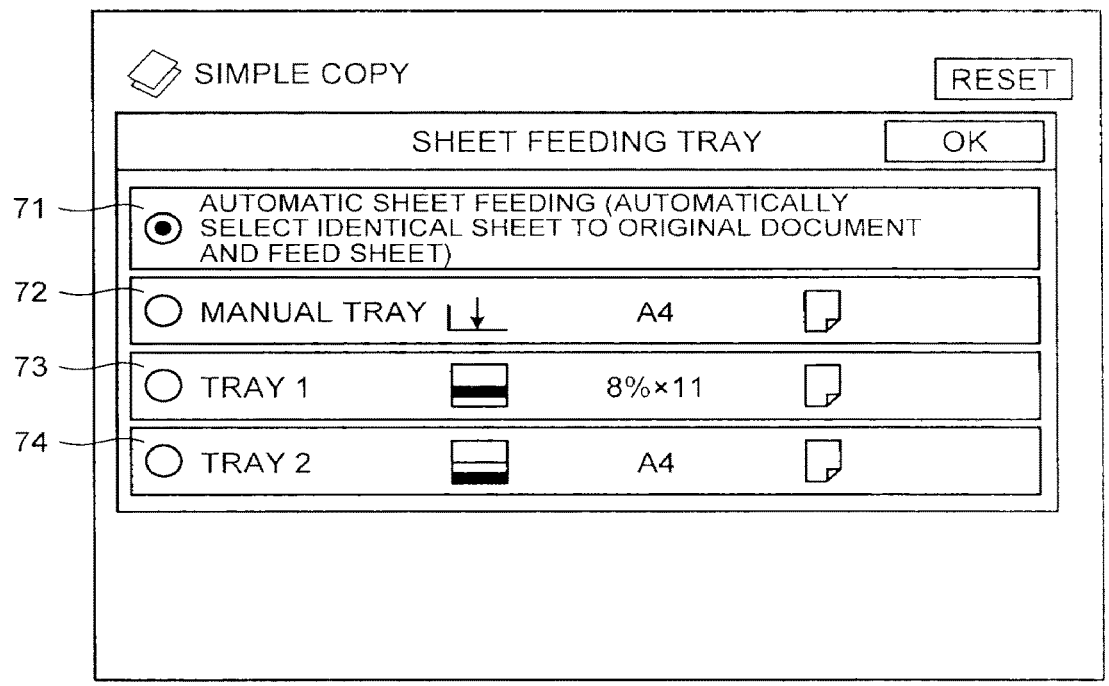
FIG. 7 is a diagram that illustrates a display example of a tray setting screen.

Next, FIG. 7 is a diagram that illustrates an example of the display of the tray setting screen. When the second button 52 of the setting widget 50 is pressed, the CPU 21 of the operating unit 20 displays the tray setting screen illustrated in FIG. 7 on the operation panel 27.

Specifically, the CPU 21 displays selection buttons 71 to 74 of "automatic sheet feeding", "manual feeding tray", "tray 1", and "tray 2" illustrated in FIG. 7. An operator operates to select, from the selection buttons 71 to 74, the button that corresponds to the desired tray or sheet feeding mode by which sheet feeding is performed. The CPU 21 of the operating unit 20 notifies the CPU 11 of the main body 10 of the tray setting that is designated by any of the selection buttons 71 to 74. The CPU 11 of the main body 10 stores, in the ROM 12, the RAM 13, or the HDD 14, the tray setting that is set by the operator via the copy AP stored in the ROM 12.

Figure 8:
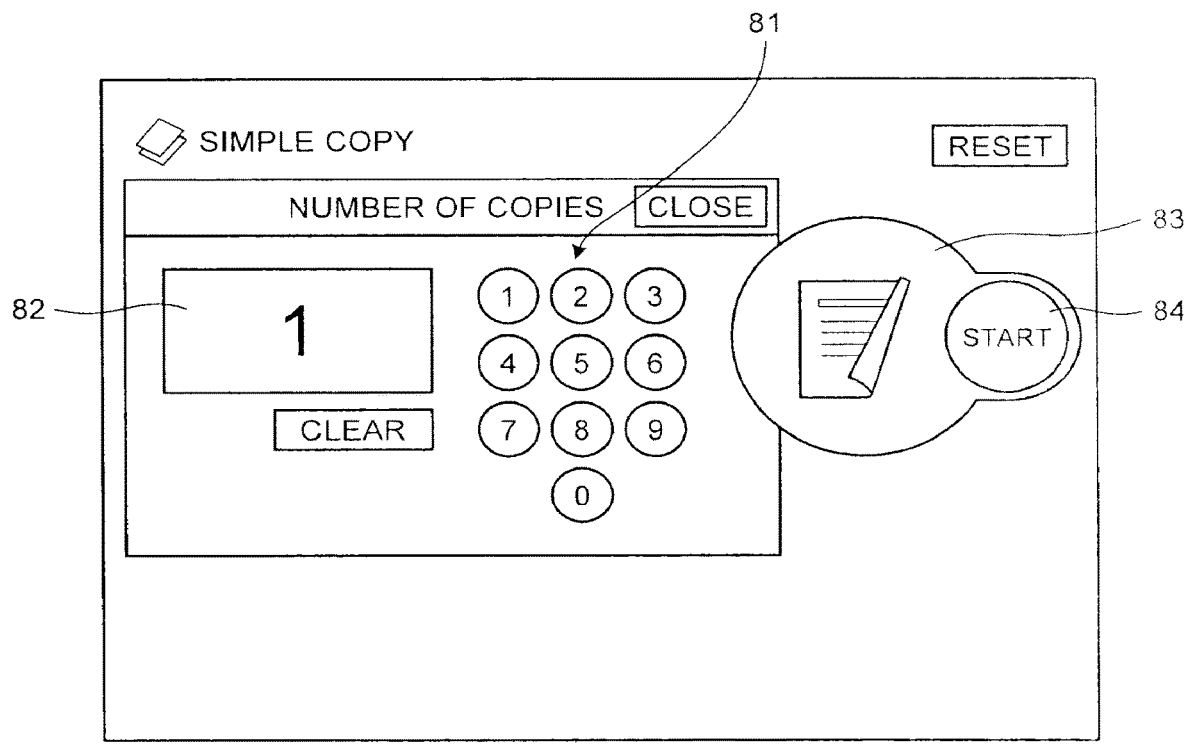
FIG. 8 is a diagram that illustrates a display example of a number-of-copies setting screen.

Next, FIG. 8 is a diagram that illustrates an example of the display of the number-of-copies setting screen for setting the number of print copies. When the third button 53 of the setting widget 50 is pressed, the CPU 21 of the operating unit 20 displays the number-of-copies setting screen illustrated in FIG. 8 on the operation panel 27.

Specifically, as illustrated in FIG. 8, the CPU 21 displays a numerical keypad 81 of "0" to "9" and a number-of-copies display section 82 that indicates the currently set number of copies. Furthermore, the CPU 21 displays an output result icon 83 that shows the image of an output result and a start button 84 for starting the copying operation. An operator designates the desired number of print copies by operating the numerical keypad 81. The CPU 21 displays, on the number-of-copies display section 82, the number of print copies that is designated by operating the numerical keypad 81. Furthermore, the CPU 21 notifies the CPU 11 of the main body 10 of the number of print copies that is designated by operating the numerical keypad 81. The CPU 11 of the main body 10 stores, in the ROM 12, the RAM 13, or the HDD 14, the number of print copies that is designated by the operator via the copy AP stored in the ROM 12. Furthermore, when the CPU 21 of the operating unit 20 detects an operator's operation of the start button 84, it feeds the detection output to the CPU 11 of the main body 10. Thus, the CPU 11 of the main body 10 controls the copying operation for the number of copies that is set by the operator.

Figure 9:
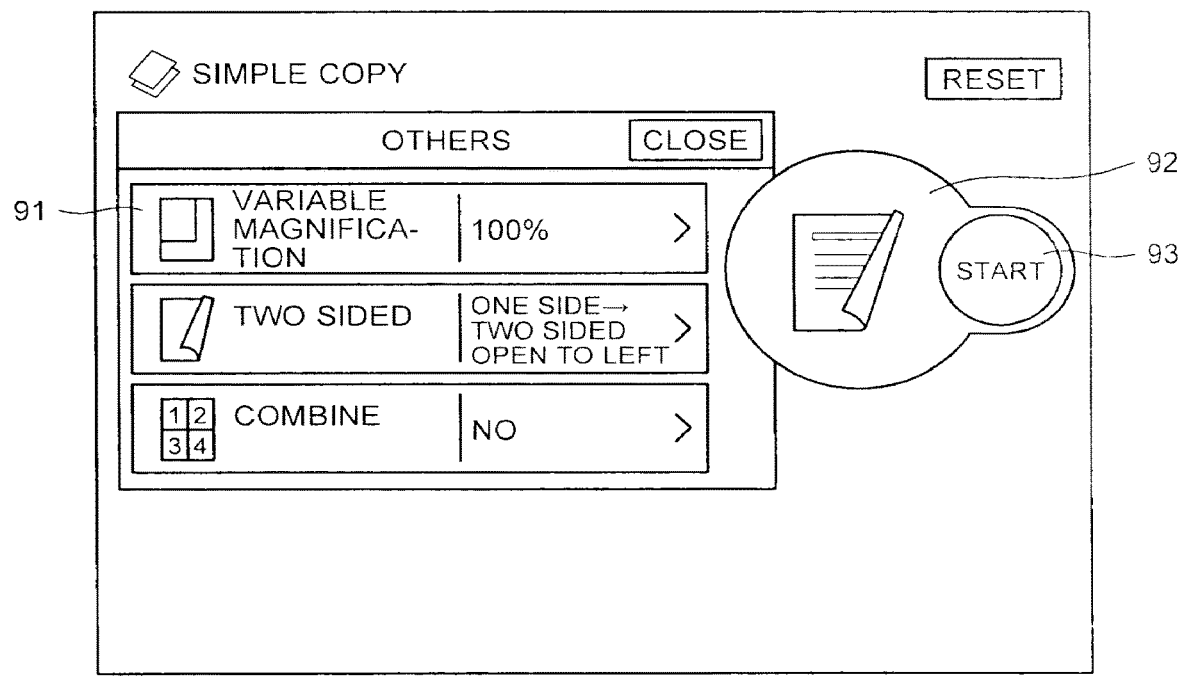
FIG. 9 is a diagram that illustrates a display example of a setting screen for the other setting items.

Next, FIG. 9 is a diagram that illustrates an example of the display of the setting screen of the other setting items that are displayed by the CPU 21 when the fourth button 54 for causing the setting screen of the setting item other than the above-described setting items to be displayed is pressed. In this case, the CPU 21 of the operating unit 20 displays the selection buttons for selecting the other setting items, such as a selection button 91 for the setting item "variable magnification" for designating the magnification for enlargement and reduction. Furthermore, the CPU 21 displays an output result icon 92 that shows the image of an output result and a start button 93 for starting of the copying operation.

When the selection button 91, or the like, is operated so that the setting item is designated, the CPU 21 displays the setting screen that corresponds to the designated setting item. An operator inputs a desired setting value via the setting screen. The CPU 21 notifies the CPU 11 of the main body 10 of the setting value of the setting item that is set by the operator. The CPU 11 of the main body 10 stores, in the ROM 12, the RAM 13, or the HDD 14, the setting value of the setting item that is set by the operator via the copy AP stored in the ROM 12. Furthermore, when the CPU 21 of the operating unit 20 detects an operator's operation of the start button 93, it feeds the detection output to the CPU 11 of the main body 10. Thus, the CPU 11 of the main body 10 controls the copying operation with the current settings.

Figure 10:
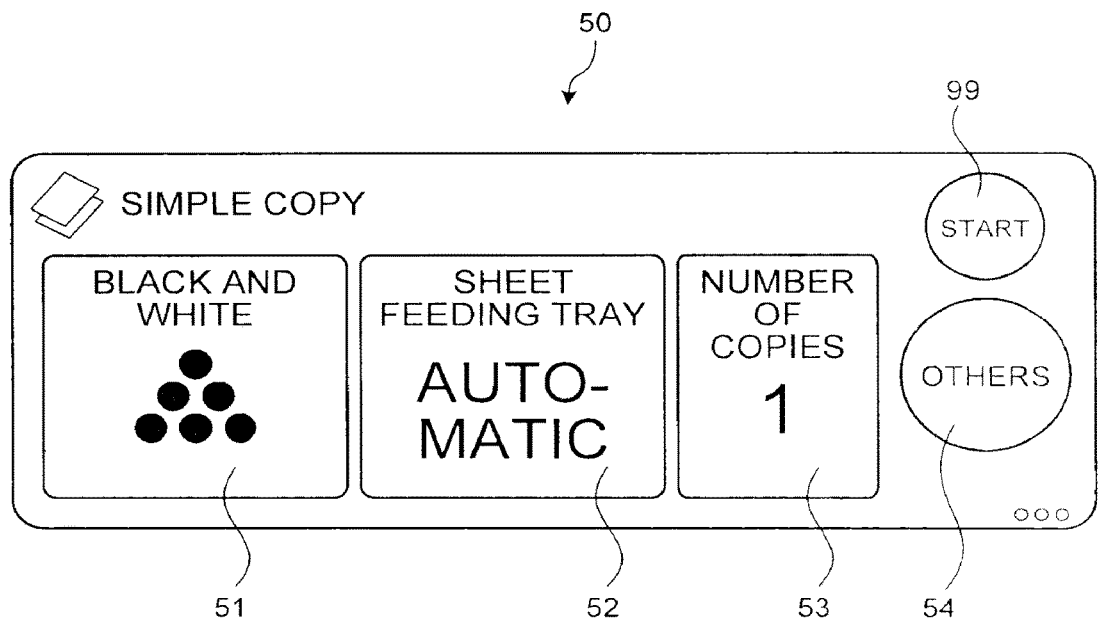
FIG. 10 is a diagram that illustrates the setting widget that displays a start button for starting copying operation.

In the above-described example, as illustrated in FIGS. 6, 8, and 9, the CPU 21 displays the start buttons 65, 84, and 93 for starting the copying operation on the setting screens. However, as illustrated in FIG. 10, the CPU 21 may display a start button 99 for starting the copying operation on the setting widget 50. In this case, an operator sees the current setting values that are displayed on the buttons 51 to 53 on the setting widget 50 to thereby know the current settings and operate the start button 99. When the CPU 21 detects an operator's operation of the start button 99, it feeds the detection output to the CPU 11 of the main body 10. Thus, the CPU 11 of the main body 10 controls the copying operation with the current settings.

Furthermore, the CPU 21 displays a copy start button 60 for starting up the copy AP on the home screen illustrated in FIG. 4. The above-described setting widget 50 is basically a widget that displays various types of settings in a state where the copy AP is not started up. Conversely, the copy start button 60 is for starting up the copy AP.

Figure 11:
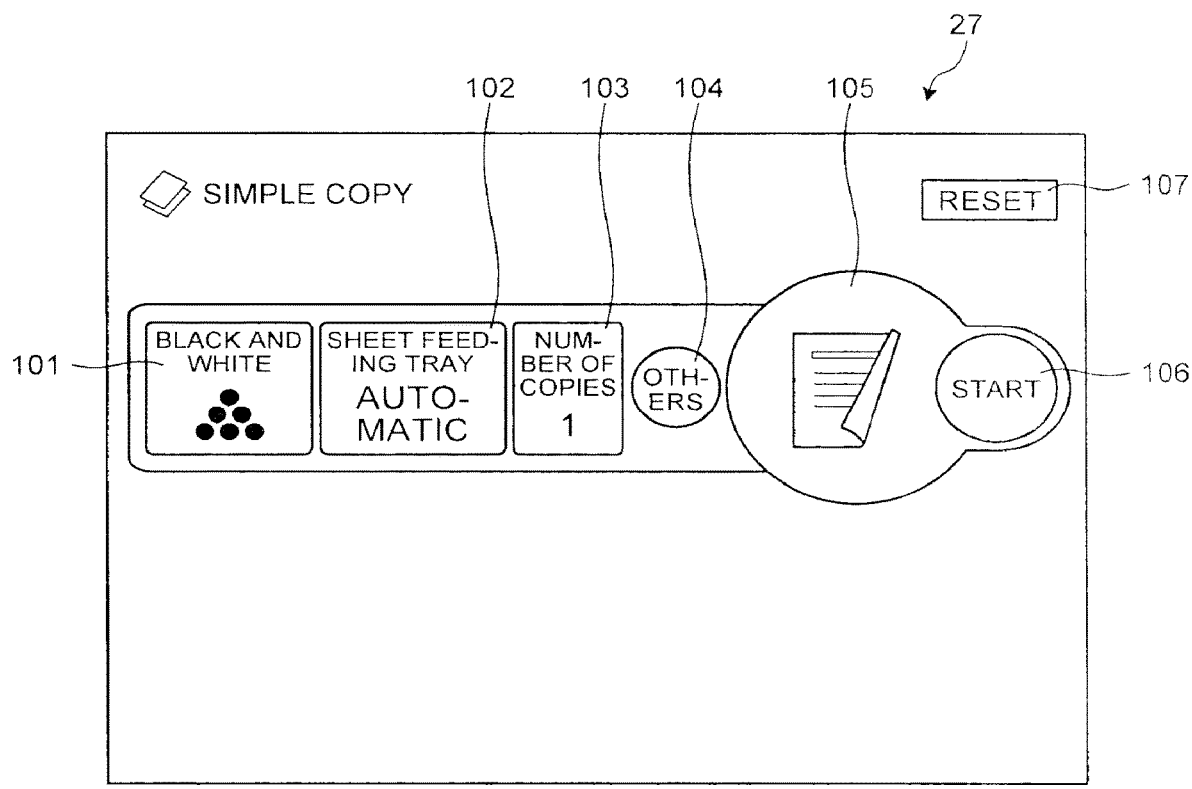
FIG. 11 is a diagram that illustrates an example of an initial screen of a copy AP.

When the CPU 21 detects an operator's operation on the copy start button 60, it reads and starts up the copy AP stored in the ROM 22, generates the initial screen illustrated in FIG. 11, and displays it on the operation panel 27. Specifically, the CPU 21 displays, on the initial screen, a color setting button 101, a tray setting button 102, a number-of-copies setting button 103, a display designation button 104 for the other setting items, an output result icon 105, a start button 106, and a reset button 107. The CPU 21 stores, in the RAM 23, or the like, the setting value that is set when the copy AP is previously terminated. Furthermore, it displays the setting values, which are set when the copy AP is previously terminated and are stored in the RAM 23, on the color setting button 101 to the number-of-copies setting button 103 of the initial screen that is displayed when the copy start button 60 is operated. The example illustrated in FIG. 11 illustrates that the settings are made such that the color setting is set to "black and white", the sheet feeding tray is set to "automatic", and the number of print copies is set to "one" when the copy AP is previously terminated.

The operator knows the current settings by seeing the setting values that are displayed on the buttons 101 to 103. When the operator changes the settings, the operator presses the button that corresponds to the setting to be changed. When the color setting button 101 is pressed, the CPU 21 of the operating unit 20 displays the color setting screen illustrated in FIG. 6 on the operation panel 27. Furthermore, when the tray setting button 102 is pressed, the CPU 21 displays the tray setting screen illustrated in FIG. 7 on the operation panel 27. Furthermore, when the number-of-copies setting button 103 is pressed, the CPU 21 displays the number-of-copies setting screen illustrated in FIG. 8 on the operation panel 27. Moreover, when the display designation button 104 of the other setting items is pressed, the CPU 21 displays the setting screen of the other setting items illustrated in FIG. 9 on the operation panel 27.

Furthermore, when the reset button 107 is operated, the CPU 21 resets the setting values that are displayed on the buttons 101 to 103 to predetermined initial values and displays them. Furthermore, when the start button 106 is operated, the CPU 21 transmits the detection output to the CPU 11 of the main body 10. Thus, the CPU 11 of the main body 10 controls the copying operation with the current settings, the part of which are displayed on the buttons 101 to 103.

Figure 12:
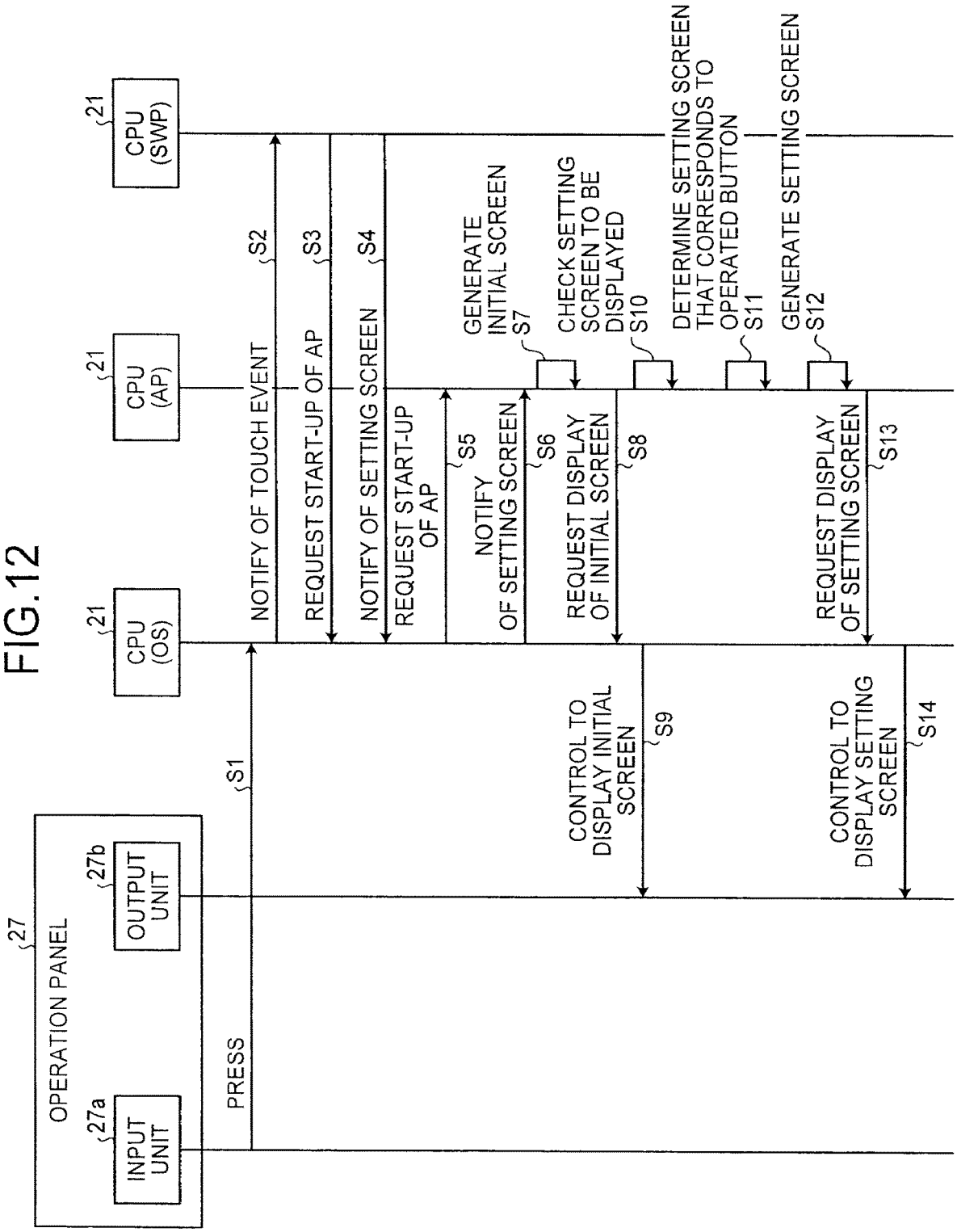
FIG. 12 is an explanatory diagram of an operation of a CPU of an operating unit in response to an operation of the setting widget of the MFP according to the first embodiment.

Next, FIG. 12 illustrates an explanatory diagram of an operation of the CPU 21 from when the setting widget 50 is pressed to when the setting screen is displayed. In FIG. 12, an input unit 27a of the operation panel 27 represents a touch detection unit, and an output unit 27b represents a liquid crystal display unit. Furthermore, the description of "CPU (OS)" indicates an operation of the CPU 21 by using the OS. Furthermore, the description of "CPU (AP)" indicates an operation of the CPU 21 by using an AP, such as the copy AP or the scanner AP. Moreover, the description of "CPU (SWP)" indicates an operation CPU 21 by using the setting widget program (SWP).

First, when the operator presses the first to third buttons 51 to 53, or the like, of the setting widget 50, the input unit 27a of the operation panel 27 outputs the detection of the pressing to the CPU 21 at Step S1. The CPU 21 receives the detection of the pressing and makes a touch event notification that indicates the occurrence of the pressing at Step S2.

When the touch event is notified, the CPU 21 makes a request to start up the AP that corresponds to the button pressed by the operator at Step S3 and notifies of the setting screen that corresponds to the button pressed by the operator at Step S4. For example, if the setting widget 50 illustrated in FIG. 4 corresponds to the copy AP, when the operator presses the first button 51 for color setting, the CPU 21 makes a request to start up the copy AP at Step S3. Furthermore, in this case, the CPU 21 notifies of the color setting screen at Step S4.

Next, the CPU 21 makes a request to start up the AP at Step S5 and makes a notification of the setting screen at Step S6. Specifically, if an explanation is given by using the above-described example, the CPU 21 makes a request to start up the copy AP at Step S5 and notifies of the color setting screen at Step S6. After the start-up request for the AP and the setting screen notification are made, the CPU 21 starts up the AP for which the start-up request has been made. Furthermore, the CPU 21 generates the initial screen of the started AP at Step S7 and makes a request to display the initial screen at Step S8. Furthermore, at Step S9, the CPU 21 controls the output unit 27*b* of the operation panel 27 so as to display the initial screen for which the display request has been made. Thus, the initial screen illustrated in, for example, FIG. 11 is displayed on the output unit 27*b*.

After the initial screen is displayed as described above, the CPU 21 uses the setting screen notified at Step S6 to check which setting screen is the setting screen to be displayed at Step S10. At Step S11, the CPU 21 determines the setting screen that corresponds to the button pressed by the operator by using the setting screen notified at Step S6. Furthermore, the CPU 21 generates the setting screen that corresponds to the button pressed by the operator at Step S12 and makes a request to display the generated setting screen at Step S13.

After the request to display the setting screen is made, the CPU 21 controls the output unit 27*b* of the operation panel 27 so as to display the generated setting screen at Step S14 instead of the initial screen displayed at Step S9. Thus, for example, if the first button 51 of the setting widget 50 of the copy AP is pressed, the color setting screen is displayed on the output unit 27*b*. The operator makes desired color settings on the color setting screen and executes the copying operation.

As it is clear from the above explanation, in the MFP 1 according to the first embodiment, the CPU 21 of the operating unit 20 performs a communication with the CPU 11 of the main body 10 at an interval of a predetermined time so as to acquire the current setting values of various types of application programs (AP). The CPU 21 of the operating unit 20 displays the button for causing each of the setting screens to be displayed on the setting widget 50 that is displayed on the home screen. Furthermore, the CPU 21 displays the acquired setting value on each of the buttons. Thus, an operator is capable of knowing the current setting values of the AP by seeing the setting value that is displayed on each of the buttons.

When an operator changes the setting value, or the like, the operator presses the button on which the setting value is displayed. The CPU 21 starts up the AP that corresponds to the pressed button and, in accordance with the started AP, the CPU 21 first displays the initial screen. Furthermore, after the initial screen is displayed, the CPU 21 generates and displays the setting screen that corresponds to the button pressed by the operator in accordance with the started AP.

Therefore, the number of operation steps to display a desired setting screen can be "only one step", i.e., just pressing the button that is displayed on the setting widget 50 and that corresponds to the desired setting screen. Thus, it is possible to achieve a significant reduction of the required number of operation steps to display a desired setting screen.

Second Embodiment

Next, an explanation is given of an MFP according to a second embodiment. As described above, the CPU 21 of the operating unit 20 performs a communication with the CPU 11 of the main body 10 at an interval of a predetermined time so as to acquire various current setting values that are set in the AP on the side of the main body 10. Furthermore, the CPU 21 applies the acquired setting values to the AP on the side of the operating unit 20 and displays the setting values, which are applied to the AP on the side of the operating unit 20, on the buttons 51 to 53, or the like, of the setting widget 50. For this reason, from the time the setting values are acquired to the time the acquired setting values are displayed on the buttons 51 to 53, or the like, of the setting widget 50, a difference may occur between the various current setting values set in the AP on the side of the main body 10 and the setting values displayed on the buttons 51 to 53, or the like, of the setting widget 50. An operator sees the setting values displayed on the buttons 51 to 53 of the setting widget 50 so as to execute an operation, such as the copying operation. However, the copying operation, or the like, is performed by using the setting values of the AP on the side of the main body 10. Therefore, if the setting values displayed on the buttons 51 to 53, or the like, of the setting widget 50 are different from the setting values of the AP on the side of the main body 10, a problem occurs in that the copying operation, or the like, is performed by using the setting values that are not known by the operator.

For this reason, in the MFP according to the second embodiment, when the buttons 51 to 53 of the setting widget 50 are pressed, the setting values of the AP on the side of the operating unit 20, to which the setting values of the AP on the side of the main body 10 are applied, are corrected to the setting values displayed on the buttons 51 to 53 of the setting widget 50. Only in this aspect, the above-described first embodiment is different from the second embodiment that will be explained below. Therefore, only the difference between them is explained below, and duplex explanations are omitted.

Figure 13:
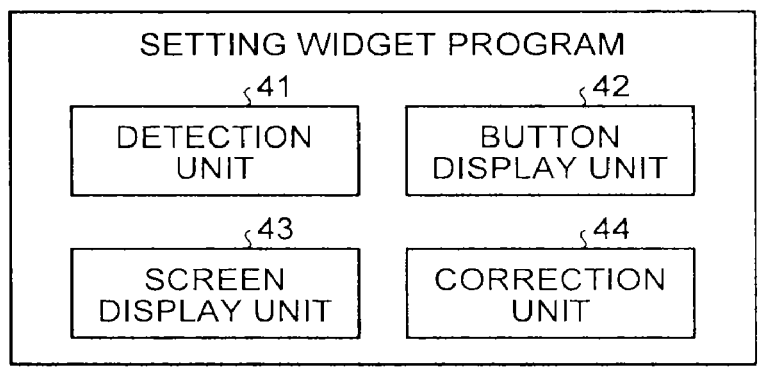
FIG. 13 is a functional block diagram of a setting widget program (SWP) that is installed in an MFP according to a second embodiment.

FIG. 13 illustrates a functional block diagram of the setting widget program (SWP) that is installed in the operating unit 20 of the MFP according to the second embodiment. In this case, the SWP includes a correction unit 44 as well as the above-described detection unit 41, the button display unit 42, and the screen display unit 43. When each of the buttons 51 to 53 of the setting widget 50 is pressed, the correction unit 44 corrects the setting values of the AP on the side of the operating unit 20, to which the setting values of the AP on the side of the main body 10 are applied, to the setting values displayed on the buttons 51 to 53 of the setting widget 50. In the explanation given by this example, the detection unit 41 to the correction unit 44 are implemented as a function of software; however, part or all of them may be implemented by hardware.

Figure 14:
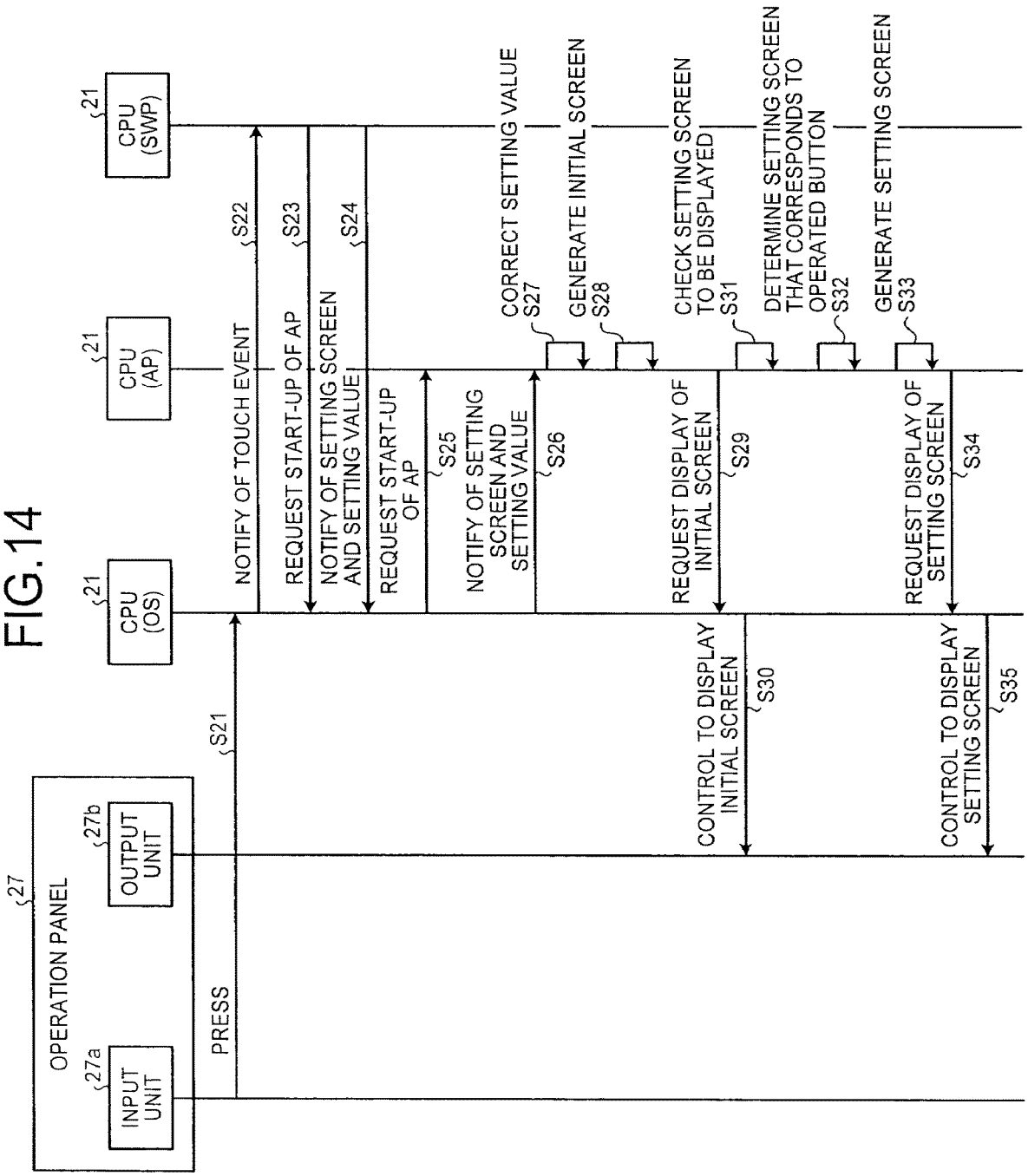
FIG. 14 is an explanatory diagram of an operation of the CPU of the operating unit in response to an operation of the setting widget of the MFP according to the second embodiment.

Next, FIG. 14 illustrates an explanatory diagram of an operation of the CPU 21 in the operating unit 20 of the MFP according to the second embodiment from when the setting widget 50 is pressed to when the setting screen is displayed. In FIG. 14, the input unit 27*a* of the operation panel 27 represents a touch detection unit, and the output unit 27*b* represents a liquid crystal display unit. Furthermore, the description of "CPU (OS)" indicates an operation of the CPU 21 by using the OS. Furthermore, the description of "CPU (AP)" indicates an operation of the CPU 21 by using an AP, such as the copy AP or the scanner AP. Moreover, the description of "CPU (SWP)" indicates an operation of the CPU 21 by using the setting widget program (SWP).

First, when an operator presses the first to third buttons 51 to 53, or the like, of the setting widget 50, the input unit 27*a* of the operation panel 27 outputs the output of the pressing to the CPU 21 at Step S21. The CPU 21 receives the detection of the pressing and makes a touch event notification that indicates the occurrence of the pressing at Step S22.

After the touch event is notified, the CPU 21 makes a request to start up the AP that corresponds to the button pressed by the operator at Step S23. Furthermore, at Step S24, the CPU 21 notifies the setting screen that corresponds to the button pressed by the operator and notifies of the setting value that is displayed on the pressed button. For example, if the setting widget 50 illustrated in FIG. 4 corresponds to the copy AP, when the operator presses the first button 51 for color settings, the CPU 21 makes a request to start up the copy AP at Step S23. Furthermore, in this case, at Step S24, the CPU 21 makes a setting screen notification of the color setting screen and makes notifies of the setting value that indicates that the printing color of "black and white" is set.

Next, the CPU 21 makes a request to start up the AP at Step S25 and notifies of the setting screen and the setting value that is displayed on the pressed button at Step S26. Specifically, if an explanation is given by using the above-described example, the CPU 21 makes a request to start up the copy AP at Step S25 and notifies of the color setting screen and the setting value that indicates that the printing color of "black and white" is set at Step S26.

After the start-up request for the AP, the setting screen, and the setting value are notified, the CPU 21 starts up the AP for which the start-up request has been made. At Step S27, the CPU 21 operates as the above-described correction unit 44 in accordance with the started AP so as to correct the setting value of the started AP to the setting value that is displayed on the pressed button. Specifically, the CPU 21 corrects the setting value of the AP on the side of the operating unit 20, which is stored in, for example, the RAM 23 or the flash memory 24 and to which the setting value of the AP on the side of the main body 10 is applied, to the setting value that is displayed on the pressed button. Thus, when the button is pressed by the operator, the setting value displayed on the pressed button can be matched to the setting value of the AP that corresponds to the button being pressed.

After the setting value is corrected as described above, the CPU 21 generates the initial screen of the started AP at Step S28 and makes a request to display the initial screen at Step S29. Furthermore, at Step S30, the CPU 21 controls the output unit 27b of the operation panel 27 so as to display the initial screen for which the display request has been made. Thus, the initial screen illustrated in, for example, FIG. 11 is displayed on the output unit 27b.

After the initial screen is displayed as described above, the CPU 21 uses the setting screen notified at Step S26 to check which setting screen is the setting screen to be displayed at Step S31. At Step S32, the CPU 21 determines the setting screen that corresponds to the button pressed by the operator by using the setting screen notified at Step S26. Furthermore, the CPU 21 generates the setting screen that corresponds to the button pressed by the operator at Step S33 and makes a request to display the generated setting screen at Step S34.

After the request to display the setting screen is made, the CPU 21 controls the output unit 27b of the operation panel 27 so as to display the generated setting screen at Step S35 instead of the initial screen displayed at Step S30. Thus, for example, when the first button 51 of the setting widget 50 of the copy AP is pressed, the color setting screen is displayed on the output unit 27b. As described above, at Step S27, the setting value that is displayed on the button pressed by the operator matches the setting value of the AP that corresponds to the pressed button. Therefore, the initial value of the setting value of the setting screen displayed on the output unit 27b is equal to the value displayed on the pressed button. The operator performs desired color settings on the color setting screen and executes copying. Thus, it is possible to perform copying, or the like, by using the setting value that is displayed on the setting widget.

As it is clear from the above explanation, in the MFP of the second embodiment, when each of the buttons 51 to 53 of the setting widget 50 is pressed, the CPU 21 of the operating unit 20 corrects the setting value of the AP on the side of the operating unit 20, to which the setting value of the AP on the side of the main body 10 is applied, to the setting value that is displayed on each of the buttons 51 to 53. Thus, it is possible to start up the AP by using the setting value that is known by the operator from each of the buttons 51 to 53 of the setting widget 50, and it is possible to achieve the same advantage as that in the above-described first embodiment.

In the MFP of the second embodiment, when each of the buttons 51 to 53 of the setting widget 50 is pressed, the CPU 21 of the operating unit 20 may apply the setting value displayed on the pressed button to the setting value of the AP on the side of the operating unit 20, to which the setting value of the AP on the side of the main body 10 is applied.

Third Embodiment

Next, an explanation is given of an MFP according to a third embodiment. In the MFP of the third embodiment, if a state is such that the setting screen that corresponds to the pressed button of the setting widget 50 cannot be displayed on the operation panel 27, the initial screen of the started AP is displayed. Only in this aspect, each of the above-described embodiments is different from the third embodiment that will be explained below. Therefore, only the difference between them is explained below, and duplex explanations are omitted.

Figure 15:
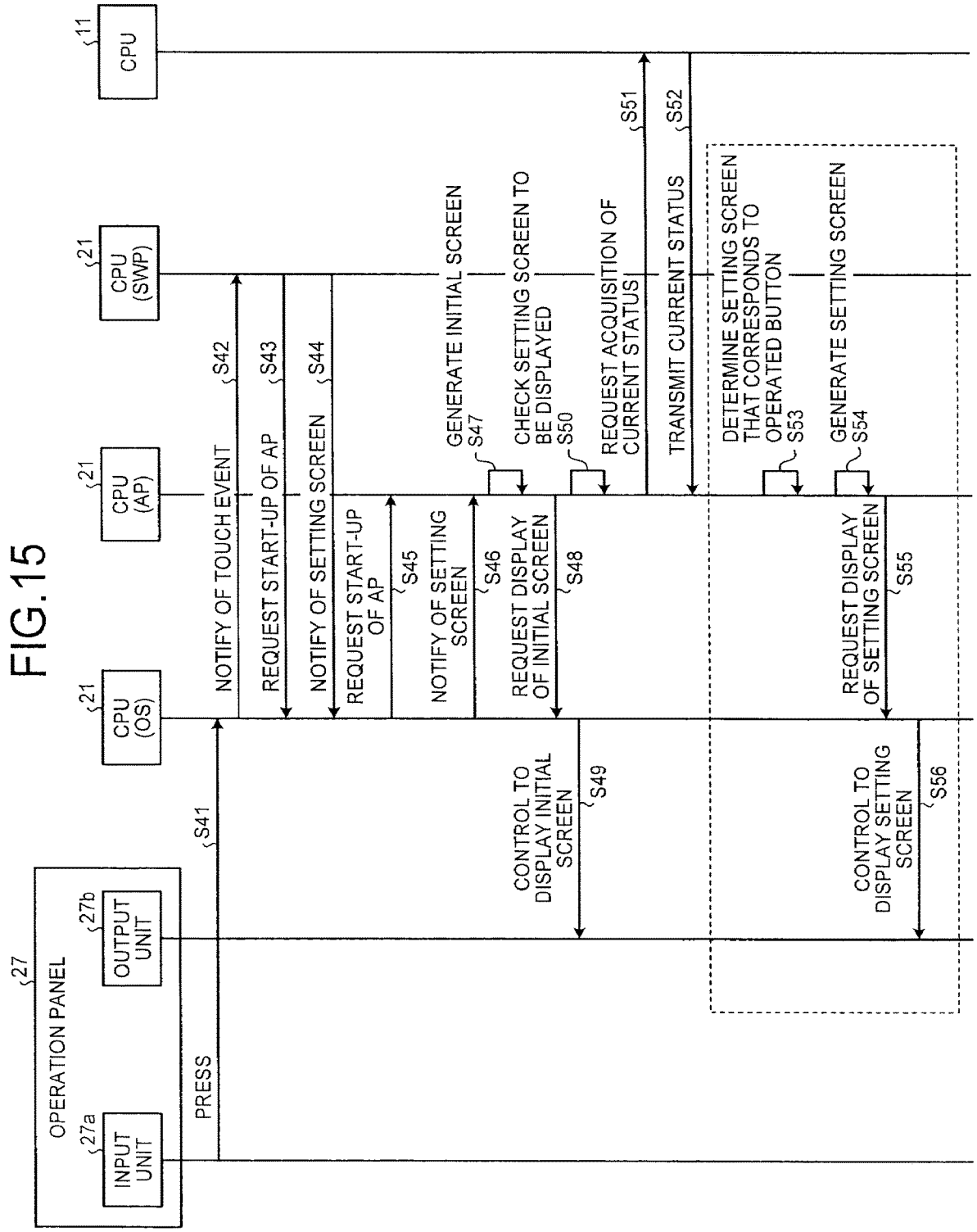
FIG. 15 is an explanatory diagram of an operation of the CPU of the operating unit in response to an operation of the setting widget of an MFP according to a third embodiment.

FIG. 15 illustrates an explanatory diagram of an operation of the CPU 21 in the operating unit 20 of the MFP according to the third embodiment from when the setting widget 50 is pressed to when the setting screen is displayed. In FIG. 15, the input unit 27a of the operation panel 27 represents a touch detection unit, and the output unit 27b represents a liquid crystal display unit. Furthermore, the description of "CPU (OS)" indicates an operation of the CPU 21 by using the OS. Furthermore, the description of "CPU (AP)" indicates an operation of the CPU 21 by using an AP, such as the copy AP or the scanner AP. Moreover, the description of "CPU (SWP)" indicates an operation of the CPU 21 by using the setting widget program (SWP).

First, when an operator presses the first to third buttons 51 to 53, or the like, of the setting widget 50, the input unit 27a of the operation panel 27 detects the pressing and outputs a detection of the pressing to the CPU 21 at Step S41. The CPU 21 receives the detection of the pressing and makes a touch event notification that indicates the occurrence of the pressing at Step S42.

When the touch event is notified, the CPU 21 makes a request to start up the AP that corresponds to the button pressed by the operator at Step S43. Furthermore, the CPU 21 notifies of the setting screen that corresponds to the button pressed by the operator at Step S44. For example, if the setting widget 50 illustrated in FIG. 4 is the setting widget that corresponds to the copy AP and if the operator presses the first button 51 for color settings, the CPU 21 makes a request to start up the copy AP at Step S43. Furthermore, in this case, the CPU 21 notifies of the color setting screen at Step S44.

Next, the CPU 21 makes a request to start up the AP at Step S45 and notifies of the setting screen at Step S46. Specifically, if an explanation is given by using the above-described example, the CPU 21 makes a request to start up the copy AP at Step S45 and notifies of the color setting screen at Step S46.

After the start-up request for the AP and the setting screen are notified, the CPU 21 starts up the AP for which the start-up request has been made, generates the initial screen of the started AP at Step S47, and makes a request to display the initial screen at Step S48. Furthermore, at Step S49, the CPU 21 controls the output unit 27b of the operation panel 27 to display the initial screen for which the display request has been made. Thus, the initial screen illustrated in, for example, FIG. 11 is displayed on the output unit 27b.

After the initial screen is displayed as described above, the CPU 21 uses the setting screen notified at Step S46 to check which setting screen is the setting screen to be displayed at Step S50. Furthermore, the CPU 21 performs a communication with the CPU 11 on the side of the main body 10 and makes a request to acquire the current status of the side of the main body 10 at Step S51. After the request to acquire the current status is made, the CPU 11 on the side of the main body 10 detects the current status of the side of the main body 10 and notifies the CPU 21 on the side of the operating unit 20 of the detected current status at Step S52.

Specifically, the request to acquire the current status at Step S51 is the inquiry as to whether a state is such that the setting screen is not displayable, for example, while a predetermined job is being executed on the side of the main body 10 or while an alarm dialogue is being displayed. In the MFP of the third embodiment, based on the current status that is returned from the CPU 11 as a result of the above inquiry, when it is determined that a state is such that the setting screen is not displayable, the CPU 21 does not display the setting screen. In this case, the initial screen generated at Step S47 is continuously displayed on the operation panel 27.

Conversely, when it is determined that a state is such that the setting screen is displayable, based on the current status that is returned from the CPU 11, the CPU 21 generates the setting screen that corresponds to the pressed button and displays it on the operation panel 27 at Steps S53 to S56.

As it is clear from the above explanation, the MFP of the third embodiment cancels the display of the setting screen if a state is such that the setting screen is not displayable and the settings are not changeable. Thus, the MFP of the third embodiment can make an operator know the current status of the AP in an easy manner and, in addition, can produce the same advantage as that of each of the above-described embodiments.

Fourth Embodiment

Next, an explanation is given of an MFP of a fourth embodiment. In the MFP of the fourth embodiment, if an area that is on the home screen and that is other than the display area of each of the buttons 51 to 54 of the setting widget 50 is pressed, the AP is started up which has been started up just before the pressing. Furthermore, the started AP displays the screen (previous display screen) that is displayed when the started AP is previously terminated. Only in this aspect, each of the above-described embodiments is different from the fourth embodiment that will be explained below. Therefore, only the different between them is explained below, and duplex explanations are omitted.

Figure 16:
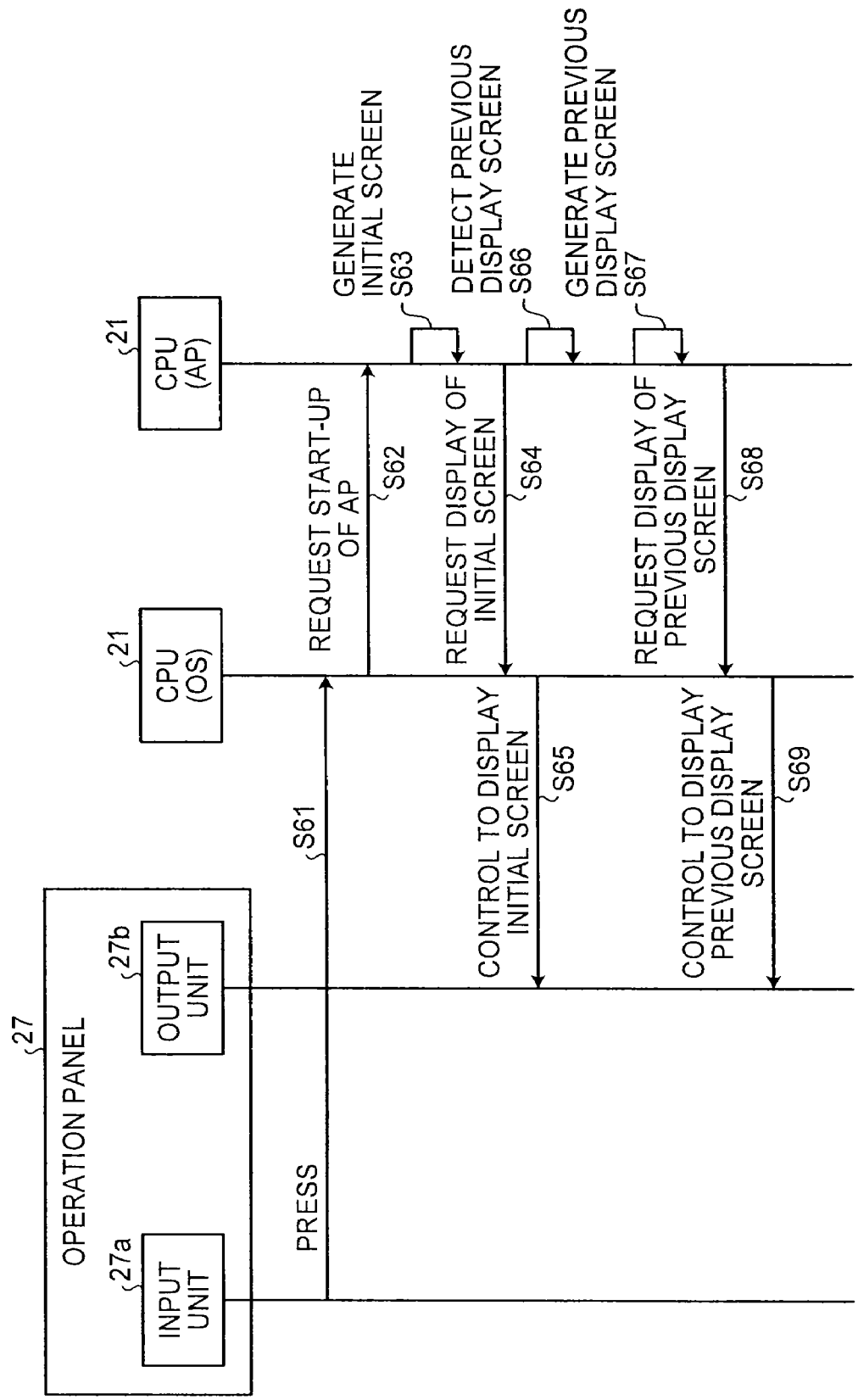
FIG. 16 is an explanatory diagram of an operation of the CPU of the operating unit in response to an operation of the setting widget of an MFP according to a fourth embodiment.

FIG. 16 illustrates an explanatory diagram of an operation of the CPU 21 in the operating unit 20 of the MFP according to the fourth embodiment from when an area that is on the home screen and that is other than the setting widget 50 is pressed to when the previous display screen is displayed. In FIG. 16, the input unit 27a of the operation panel 27 represents a touch detection unit, and the output unit 27b represents a liquid crystal display unit. Furthermore, the description of "CPU (OS)" indicates an operation of the CPU 21 by using the OS. Furthermore, the description of "CPU (AP)" indicates an operation of the CPU 21 by using an AP, such as the copy AP or the scanner AP.

First, when an operator presses an area other than the display area of each of the buttons 51 to 54 of the setting widget 50 on the home screen, the input unit 27a of the operation panel 27 detects the pressing at Step S61. The input unit 27a outputs a detection of the pressing to the CPU 21. The CPU 21 receives the detection of the pressing. In this case, the detection indicates that an area other than the display area of each of the buttons 51 to 54 of the setting widget 50 on the home screen is pressed. Therefore, at Step S62, the CPU 21 makes a request to start up the AP that has been started up just before the button is pressed.

Next, the CPU 21 starts up the AP for which the start-up request has been made and generates the initial screen of the started AP at Step S63. Furthermore, the CPU 21 makes a request to display the initial screen at Step S64. After the display request is made, the CPU 21 displays, on the operation panel 27, the initial screen for which the display request has been made at Step S65.

Next, the CPU 21 detects the screen (previous display screen) that is displayed when the started AP is previously terminated at Step S66 and generates the previous display screen to be displayed at Step S67. Specifically, when a termination operation of the AP is performed, the CPU 21 stores, in the RAM 23, the flash memory 24, or the like, the information (previous display screen information) that indicates the screen displayed at that time. The CPU 21 detects the stored previous display screen information from the RAM 23, or the like, at Step S66 and generates the previous display screen to be displayed at Step S67. After the previous display screen is generated, the CPU 21 makes a request to display the previous display screen at Step S68. When the request to display the previous display screen is made, the CPU 21 displays the generated previous display screen on the operation panel 27 at Step S69.

As it is clear from the above explanation, in the MFP of the fourth embodiment, when an area other than the display area of each of the buttons 51 to 54 of the setting widget 50 is pressed, the AP is started up which has been started up just before the pressing. Furthermore, the screen (previous display screen) that is displayed when the started AP is previously terminated is displayed. Thus, the MFP of the fourth embodiment is capable of providing two display forms that are selectable by an operator, i.e., a display form for displaying the setting screen when each of the buttons 51 to 54 of the setting widget 50 is pressed and a display form for displaying the previous display screen when an area other than each of the buttons 51 to 54 is pressed. Besides, it is also capable of producing the same advantage as that of each of the above-described embodiments.

Fifth Embodiment

Next, an explanation is given of an MFP of a fifth embodiment. In the MFP of the fifth embodiment, if any of the APs has been started up and if a different screen that is other than the setting screen that corresponds to each of the buttons 51 to 54 of the setting widget 50 is displayed on the operation panel 27 in accordance with started AP, the display of the different screen is terminated and the setting screen that corresponds to the pressed button is displayed. Only in this aspect, each of the above-described embodiments is different from the fifth embodiment that will be described below. Therefore, only the difference between them is explained below, and duplex explanations are omitted.

Figure 17:
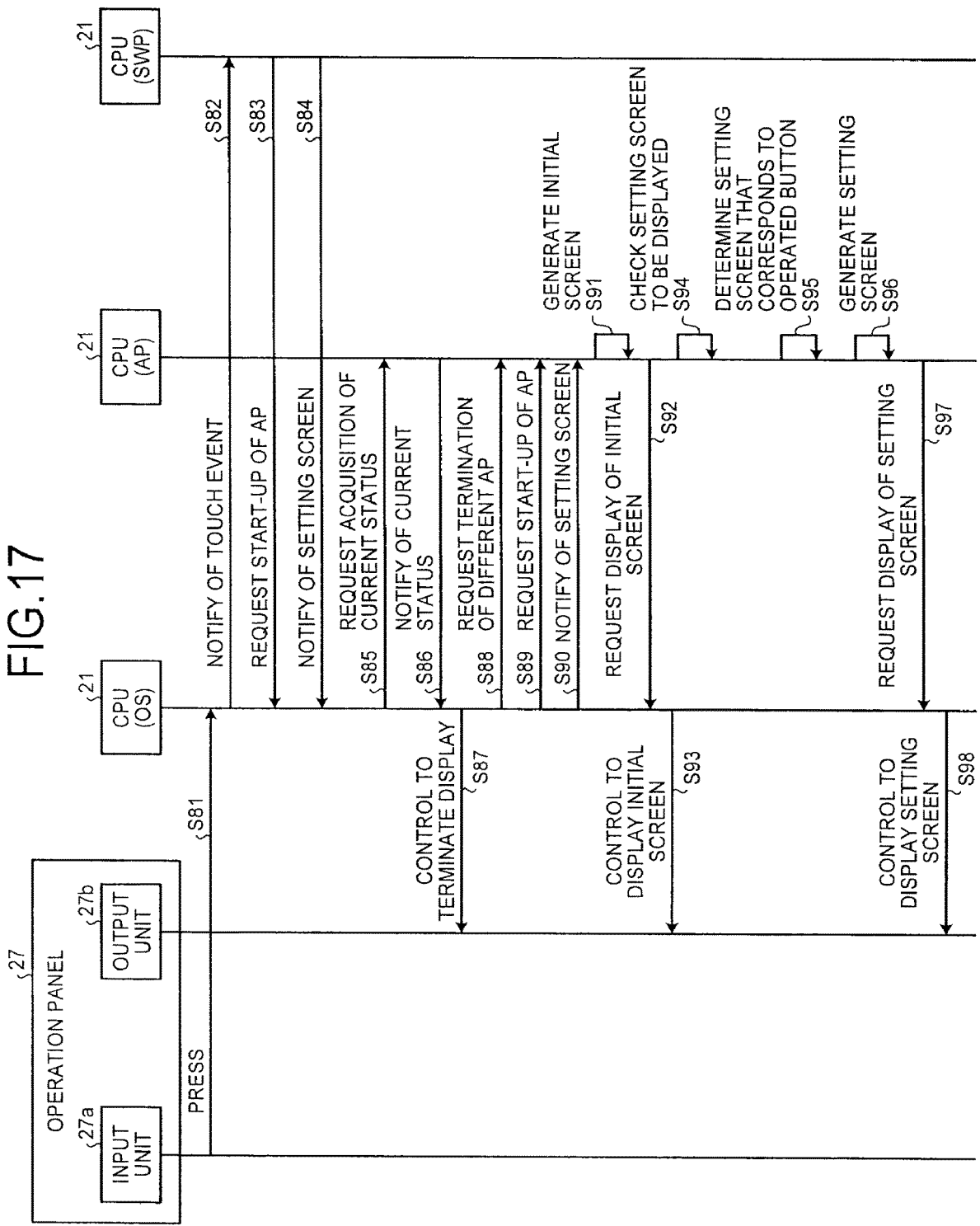
FIG. 17 is an explanatory diagram of an operation of the CPU of the operating unit in response to an operation of the setting widget of an MFP according to a fifth embodiment.

FIG. 17 illustrates an explanatory diagram of a display operation of the operating unit 20 of the MFP according to the fifth embodiment. In FIG. 17, the input unit 27*a* of the operation panel 27 represents a touch detection unit, and the output unit 27*b* represents a liquid crystal display unit. Furthermore, the description of "CPU (OS)" indicates an operation of the CPU 21 by using the OS. Furthermore, the description of "CPU (AP)" indicates an operation of the CPU 21 by using an AP, such as the copy AP or the scanner AP. Moreover, the description of "CPU (SWP)" indicates an operation of the CPU 21 by using the setting widget program (SWP).

First, while a different screen that is other than the setting screen that corresponds to each of the buttons 51 to 54 of the setting widget 50 is displayed on the operation panel 27 in accordance with the already started AP, an operator presses the first to third buttons 51 to 53, or the like, of the setting widget 50. The input unit 27*a* of the operation panel 27 detects the pressing at Step S81 and outputs a detection of the pressing to the CPU 21. The CPU 21 receives a detection of the pressing and makes a touch event notification that indicates the occurrence of the pressing at Step S82.

When the touch event is notified, the CPU 21 makes a request to start up the AP that corresponds to the button pressed by the operator at Step S83. Furthermore, the CPU 21 notifies of the setting screen that corresponds to the button pressed by the operator at Step S84.

Here, in the case of this example, a state is such that the AP has been already started up and a different screen that is other than the setting screen that corresponds to each of the buttons 51 to 54 of the setting widget 50 is displayed on the operation panel 27 in accordance with the started AP. Therefore, the CPU 21 makes a request to acquire the current status of the currently running AP at Step S85. After the request to acquire the current status is made, the CPU 21 makes a current status notification that indicates the current display status, such as while the initial screen is being displayed or while the general menu is being displayed, in accordance with the already started AP at Step S86. The CPU 21 determines the current status of the currently running AP by using the current status notification. Furthermore, the CPU 21 controls the operation panel 27 so as not to display the display screen that is displayed in accordance with the currently running AP at Step S87.

Next, the CPU 21 makes a request to terminate the AP at Step S88 so as to control termination of the currently running AP. Continuously, the CPU 21 makes a request to start up the AP that corresponds to the button pressed by the operator at Step S89. Furthermore, the CPU 21 notifies of the setting screen that corresponds to the button pressed by the operator at Step S90.

After the request to start up the AP and the setting screen are notified, the CPU 21 starts up the AP for which the start-up request has been made. Furthermore, the CPU 21 generates the initial screen of the started AP at Step S91 and makes a request to display the initial screen at Step S92. Furthermore, the CPU 21 controls the output unit 27*b* of the operation panel 27 so as to display the initial screen for which the display request has been made at Step S93. Thus, the initial screen illustrated in, for example, FIG. 11 is displayed on the output unit 27*b*.

After the initial screen is displayed as described above, the CPU 21 uses the setting screen notification notified at Step S90 to check which setting screen is the setting screen to be displayed at Step S94. Furthermore, the CPU 21 determines the setting screen that corresponds to the button pressed by the operator at Step S95 by using the setting screen notification notified at Step S90. Furthermore, the CPU 21 generates the setting screen that corresponds to the button pressed by the operator at Step S96 and makes a request to display the generated setting screen at Step S97. After the request to display the setting screen is made, the CPU 21 controls the output unit 27*b* of the operation panel 27 so as to display the generated setting screen at Step S98.

As it is clear from the above explanation, in the MFP of the fifth embodiment, if any of the APs has been already started up and if a different screen other than the setting screen that correspond to each of the buttons 51 to 54 of the setting widget 50 is displayed on the operation panel 27 in accordance with the started AP, the display of the different screen is terminated and the setting screen that corresponds to the pressed button is displayed. Thus, it is possible to prevent a problem in that multiple screens are displayed on the operation panel 27 in an overlapped manner that makes it difficult to see the setting screen.

Furthermore, in the case of the CPU that is not compatible with multiple jobs, if the AP has been already started up, it is difficult to display the setting screen that corresponds to the pressed button. However, in the MFP of the fifth embodiment, after the already started AP is terminated, the setting screen that corresponds to the pressed button is displayed. Therefore, even in the case of the CPU that is not compatible with multiple jobs, it is possible to display the setting screen in a smooth manner. Furthermore, in addition to this, the MFP of the fifth embodiment can produce the same advantage as that of each of the above-described embodiments.

Sixth Embodiment

Next, an explanation is given of an MFP of a sixth embodiment. In the MFP of the sixth embodiment, the button that is operated to change the setting value is displayed on the setting widget 50. In the MFP, when any of the buttons 51 to 54 of the setting widget 50 is pressed, the AP program that corresponds to the pressed button is started up. Furthermore, the setting screen that corresponds to the pressed button is displayed in accordance with the started AP in a state where the changed setting value is displayed thereon. Only in this aspect, each of the above-described embodiments is different from the sixth embodiment that will be explained below. Therefore, only the difference between them is explained below, and duplex explanations are omitted.

Figure 18:
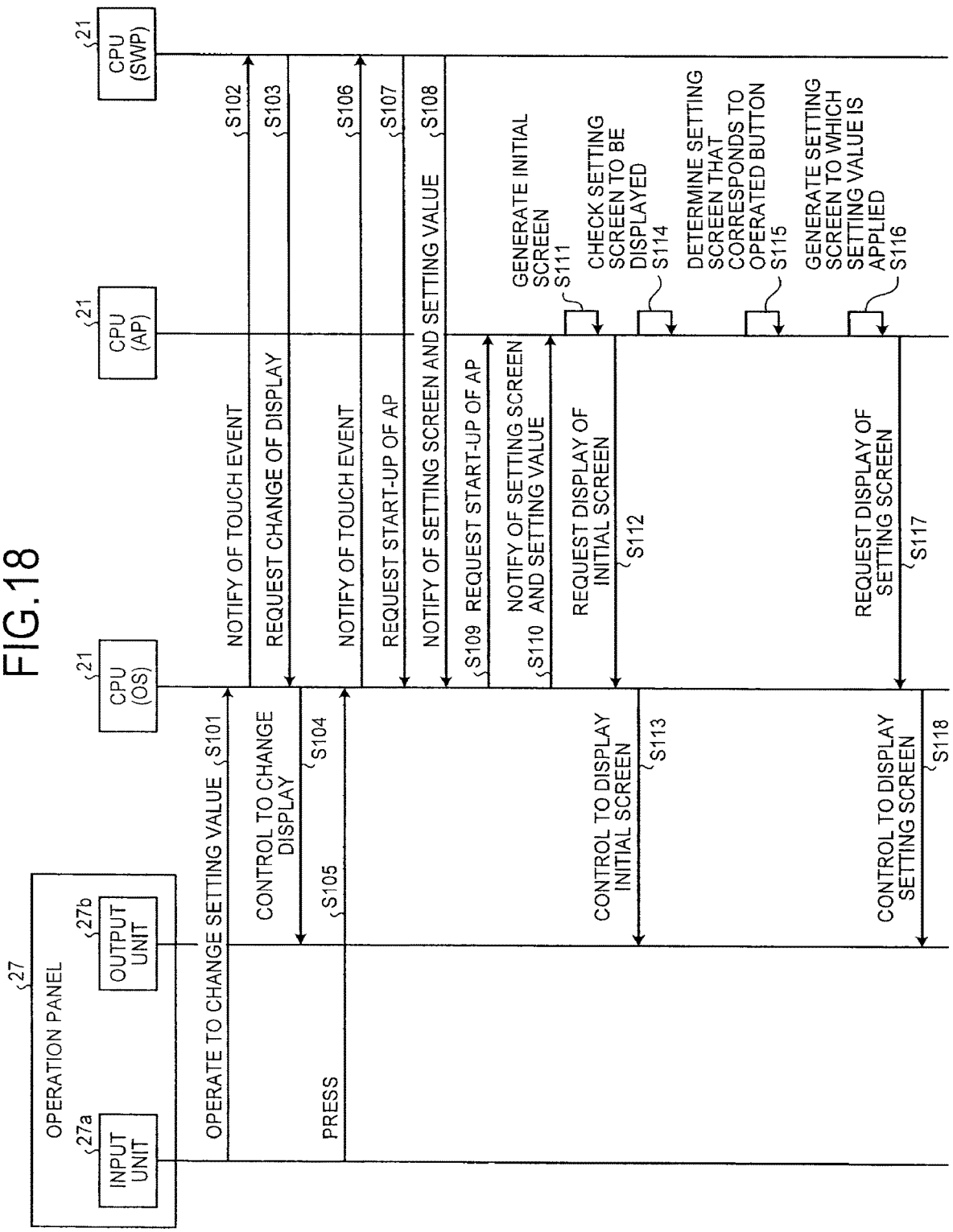
FIG. 18 is an explanatory diagram of an operation of the CPU of the operating unit in response to an operation of the setting widget of an MFP according to a sixth embodiment.

FIG. 18 illustrates an explanatory diagram of a display operation of the operating unit 20 of the MFP according to the sixth embodiment. In FIG. 18, the input unit 27*a* of the operation panel 27 represents a touch detection unit, and the output unit 27*b* represents a liquid crystal display unit. Furthermore, the description of "CPU (OS)" indicates an operation of the CPU 21 by using the OS. Furthermore, the description of "CPU (AP)" indicates an operation of the CPU 21 by using an AP, such as the copy AP or the scanner AP. Furthermore, the description of "CPU (SWP)" indicates an operation of the CPU 21 by using the setting widget program (SWP).

As an example, in the case of this embodiment, the CPU 21 of the operating unit 20 perceives an instantaneous touch operation on each of the buttons 51 to 53 displayed on the setting widget 50 as an operator's operation to change the setting value that corresponds to each of the buttons 51 to 53. Furthermore, the CPU 21 perceives an operation to long press each of the buttons 51 to 53 as an operator's operation to designate the display of the setting screen that corresponds to each of the buttons 51 to 53.

When the CPU 21 detects the operator's operation to change the setting value at Step S101 in FIG. 18, it makes a touch event notification of the operator's operation to change the setting value at Step S102. After the touch event notification is made, the CPU 21 makes a display change request via the AP that corresponds to the button that is operated to change the setting value at Step S103. After the display change request is made, the CPU 21 changes the setting value currently displayed on the button to the value that corresponds to the operator's operation and displays the changed setting value on the button at Step S104.

Specifically, as described with reference to FIG. 6, for example, the types of color settings displayed on the first button 51 are the three types, i.e., "full color", "automatic color", and "black and white". Therefore, each time the first button 51 is touched, the CPU 21 changes the setting value displayed on the first button 51, i.e., "full color", "automatic color", "black and white", "full color", and "automatic color" in this order, for example. In the same manner, the number of print copies is displayed on the third button 53. Therefore, each time the third button 53 is touched, the CPU 21 changes the setting value displayed on the third button 53, i.e., "1", "2", "3", "4", "5" . . . in this order, for example.

Next, when the operator presses the first to third buttons 51 to 53, or the like, of the setting widget 50 (in the case of this example, long pressing of the button), the input unit 27*a* of the operation panel 27 detects the pressing at Step S105 and outputs a detection of the pressing to the CPU 21. The CPU 21 receives the detection of the pressing and makes a touch event notification that indicates the occurrence of the pressing at Step S106.

After the touch event is notified, the CPU 21 makes a request to start up the AP that corresponds to the button pressed by the operator at Step S107. Furthermore, at Step S108, the CPU 21 notifies of the setting screen that corresponds to the button pressed by the operator and notifies of the setting value that is displayed on the pressed button (i.e., the changed setting value).

Next, the CPU 21 makes a request to start up the AP at Step S109 and notifies of the setting screen and the setting value that is displayed on the pressed button at Step S110. After the start-up request for the AP, the setting screen, and the setting value are notified, the CPU 21 starts up the AP for which the start-up request has been made.

Next, the CPU 21 generates the initial screen of the started AP at Step S111 and makes a request to display the initial screen at Step S112. Furthermore, the CPU 21 controls the output unit 27*b* of the operation panel 27 so as to display the initial screen for which the display request has been made at Step S113. Thus, the initial screen illustrated in, for example, FIG. 11 is displayed on the output unit 27*b*.

After the initial screen is displayed as described above, the CPU 21 uses the setting screen notification notified at Step S110 to check which setting screen is the setting screen to be displayed at Step S114. Furthermore, at Step S115, the CPU 21 determines the setting screen that corresponds to the button pressed by the operator by using the setting screen notification notified at Step S110. Moreover, the CPU 21 generates the setting screen that corresponds to the button pressed by the operator at Step S116 and makes a request to display the generated setting screen at Step S117.

After the request to display the setting screen is made, at Step S118, the CPU 21 controls the output unit 27*b* of the operation panel 27 so as to display the setting screen generated at Step S116 instead of the initial screen displayed at Step S113. Thus, it is possible to display the setting screen to which the setting value changed by the operator's operation is applied.

As it is clear from the above explanation, in the MFP of the sixth embodiment, each time an operator's operation (an instantaneous touch) to change the setting value is performed, the setting value displayed on the button of the setting widget is changed. Then, when the setting screen is displayed (i.e., when an operator presses the setting screen), the changed setting value is reflected thereon. Thus, the setting value can be changed in an easy manner by performing only a touch operation on each of the buttons 51 to 54 of the setting widget 50. Furthermore, as the changed setting value is automatically applied (reflected) to the setting screen, the setting value can be changed in an easy manner. In addition, in the MFP of the sixth embodiment, it is possible to achieve the same advantage as that of each of the above-described embodiments.

According to the present invention, an advantage can be provided so as to achieve a reduction of the number of operation steps required to display a desired screen.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An mobile terminal device comprising:
 a display; and
 processing circuitry configured to:
  display, on the display, a screen including a widget that receives a user operation to instruct execution of an image forming function of an image forming apparatus and a button that receives a user operation to instruct a start of an application for providing the image forming function of the image forming apparatus, the widget and the button being displayed simultaneously on the display such that a display area of the widget and a display area of the button do not overlap each other; and
  display, on the widget, a start button that receives a user operation to instruct the execution of the image forming function corresponding to the widget and one or more setting values for controlling the execution of the image forming function of the image forming apparatus, the setting value being input through a setting screen of the application having been started with the button.

2. The mobile terminal device according to claim 1, wherein
 the application is stored in the mobile terminal device, and
 the processing circuitry is configured to
  start the application in response to the user operation to the button, and
  display, on the display, the setting screen of the started application.

3. The mobile terminal device according to claim 2, wherein the processing circuitry is configured to, in response to reception of a user operation to a start button on the widget, instruct the image forming apparatus to execute the image forming function corresponding to the widget in accordance with the setting value that is input through the setting screen displayed on the display.

4. The mobile terminal device according to claim 1, wherein
the image forming function is any of a copy function, a scanner function, a facsimile function, and a print function, and
the setting value includes one or more of:
a setting value for a color;
a setting value for a sheet feeding tray;
a setting value for the number of prints or copies;
a setting value for a magnification for enlargement and reduction;
a setting value for a double-side printing; and
a setting value for collective printing.

5. The mobile terminal device according to claim 1, wherein the processing circuitry is configured to display, on the widget, the one or more setting values even when the user operation is not received.

6. The mobile terminal device according to claim 1, wherein the button and the start button are different buttons.

7. A method, implemented by a mobile terminal device that includes a display and processing circuitry, the method comprising:
displaying, on the display, a screen including a widget that receives a user operation to instruct execution of an image forming function of an image forming apparatus and a button that receives a user operation to instruct a start of an application for providing the image forming function of the image forming apparatus, the widget and the button being displayed simultaneously on the display such that a display area of the widget and a display area of the button do not overlap each other; and
displaying, on the widget, a start button that receives a user operation to instruct the execution of the image forming function corresponding to the widget and one or more setting values for controlling the execution of the image forming function of the image forming apparatus, the setting value being input through a setting screen of the application having been started with the button.

8. The method according to claim 7, wherein
the application is stored in the mobile terminal device, and
the method further includes:
starting the application in response to the user operation to the button, and
displaying, on the display, the setting screen of the started application.

9. The method according to claim 8, further comprising:
in response to reception of a user operation to a start button on the widget, instructing the image forming apparatus to execute the image forming function corresponding to the widget in accordance with the setting value that is input through the setting screen displayed on the display.

10. The method according to claim 7, wherein
the image forming function is any of a copy function, a scanner function, a facsimile function, and a print function, and
the setting value includes one or more of:
a setting value for a color;
a setting value for a sheet feeding tray;
a setting value for the number of prints or copies;
a setting value for a magnification for enlargement and reduction;
a setting value for a double-side printing; and
a setting value for collective printing.

11. The method according to claim 7, wherein the method includes displaying, on the widget, the one or more setting values even when the user operation is not received.

12. The method according to claim 7, wherein the button and the start button are different buttons.

13. An information processing system comprising:
a mobile terminal device; and
an image forming apparatus, wherein
the mobile terminal device comprises:
a display; and
processing circuitry configured to
display, on the display, a screen including a widget that receives a user operation to instruct execution of an image forming function of the image forming apparatus and a button that receives a user operation to instruct a start of an application for providing the image forming function of the image forming apparatus, the widget and the button being displayed simultaneously on the display such that a display area of the widget and a display area of the button do not overlap each other; and
display, on the widget a start button that receives a user operation to instruct the execution of the image forming function corresponding to the widget and one or more setting values for controlling the execution of the image forming function of the image forming apparatus, the setting value being input through a setting screen of the application having been started with the button, and
the image forming apparatus comprises processing circuitry configured to execute the image forming function based on the setting value.

14. The system according to claim 13, wherein
the application is stored in the mobile terminal device, and
the processing circuitry of the mobile terminal device is configured to
start the application in response to the user operation to the button, and
display, on the display, the setting screen of the started application.

15. The system according to claim 14, wherein the processing circuitry of the mobile terminal device is configured to, in response to reception of a user operation to a start button on the widget, instruct the image forming apparatus to execute the image forming function corresponding to the widget in accordance with the setting value that is input through the setting screen displayed on the display.

16. The system according to claim 13, wherein
the image forming function is any of a copy function, a scanner function, a facsimile function, and a print function, and
the setting value includes one or more of:
a setting value for a color;
a setting value for a sheet feeding tray;
a setting value for the number of prints or copies;
a setting value for a magnification for enlargement and reduction;
a setting value for a double-side printing; and
a setting value for collective printing.

17. The system according to claim 13, wherein the processing circuitry is configured to display, on the widget, the one or more setting values even when the user operation is not received.

18. The system according to claim 13, wherein the button and the start button are different buttons.

* * * * *